April 27, 1948.
J. C. McCUNE
2,440,343
BRAKE CONTROL SYSTEM
Original Filed April 30, 1943  8 Sheets-Sheet 1
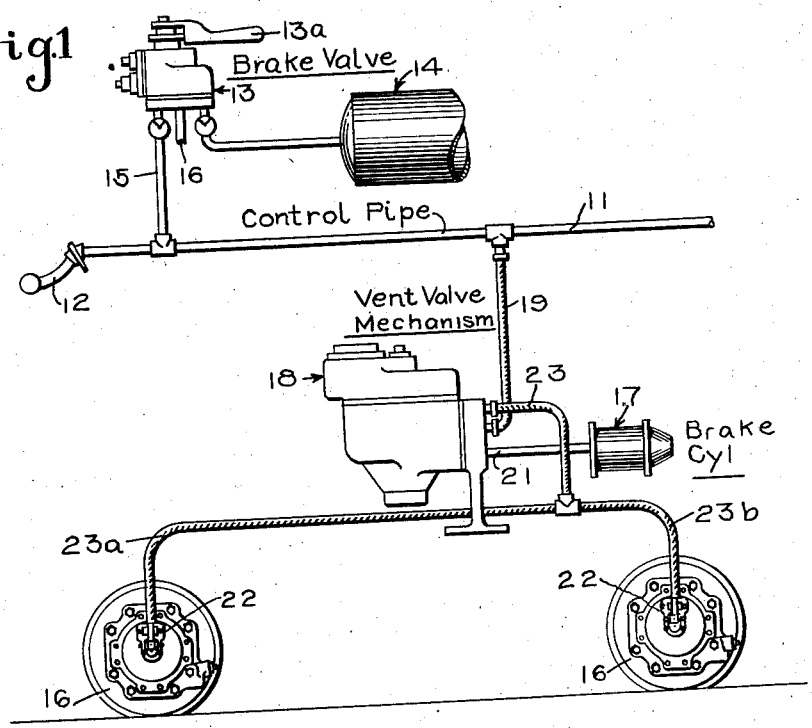
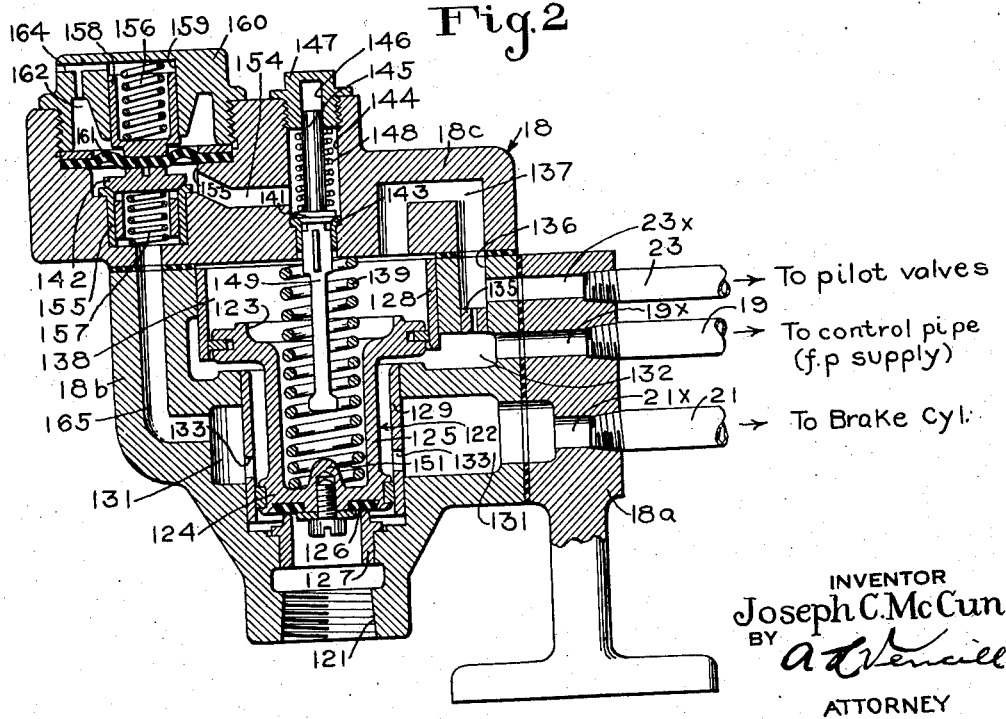
INVENTOR
Joseph C. McCune
BY
ATTORNEY

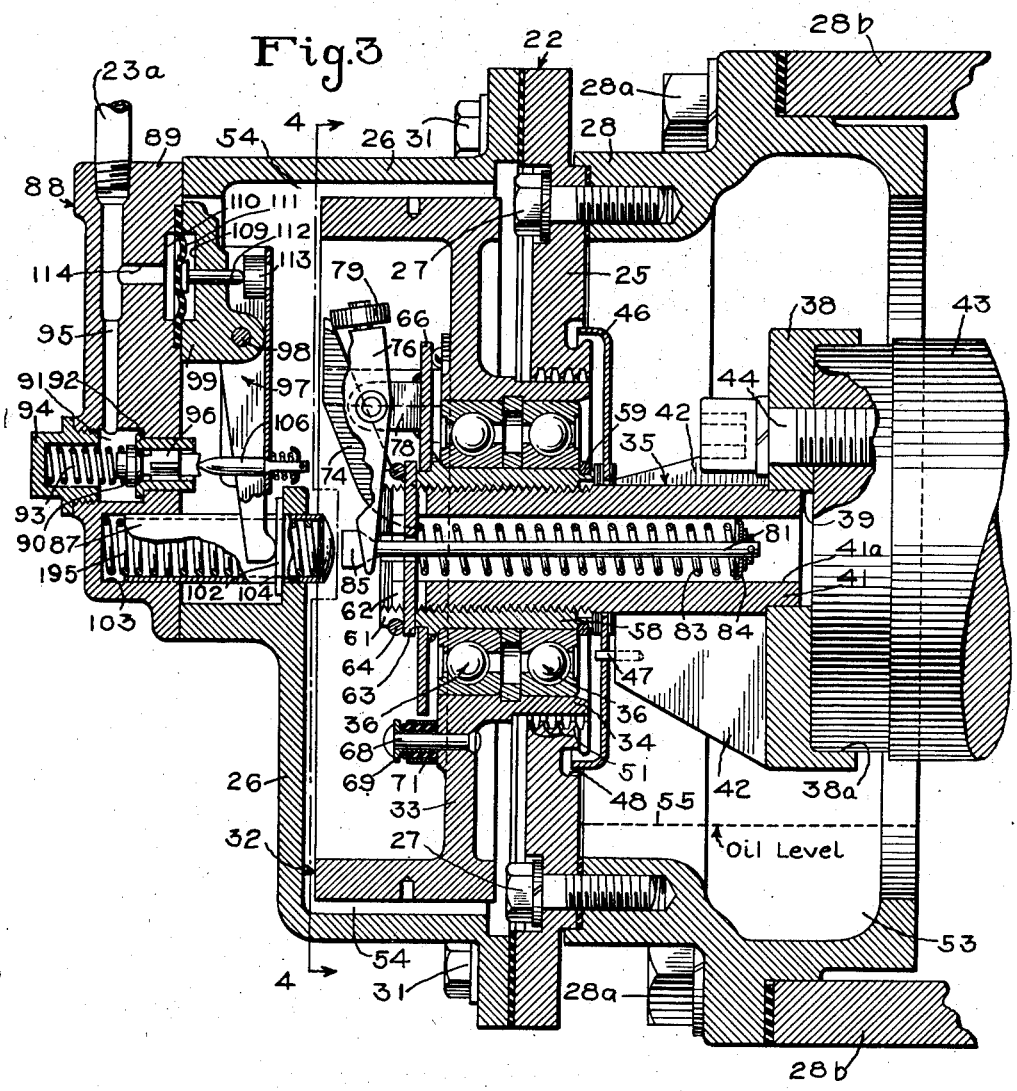

April 27, 1948.　　　　J. C. McCUNE　　　　2,440,343
BRAKE CONTROL SYSTEM
Original Filed April 30, 1943　　8 Sheets-Sheet 3
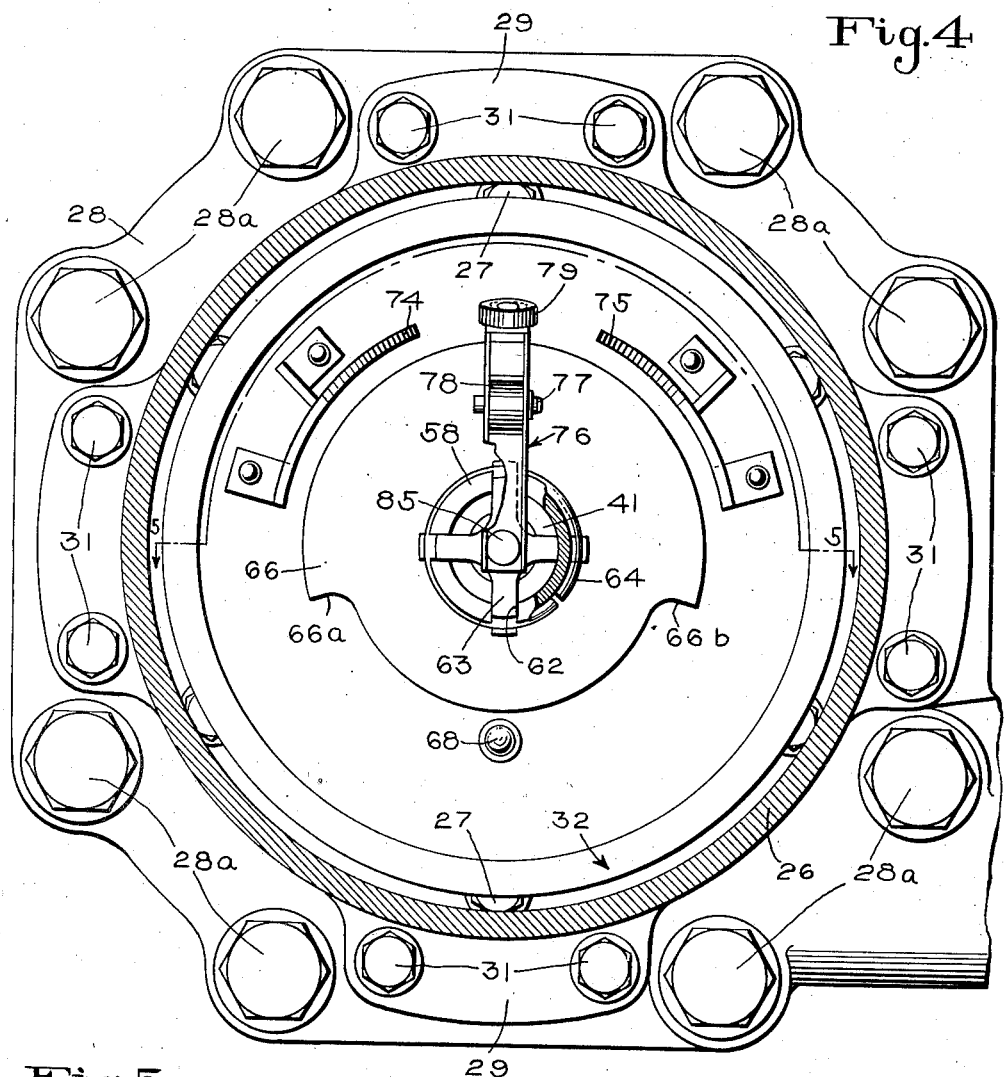
Fig.4
Fig.5
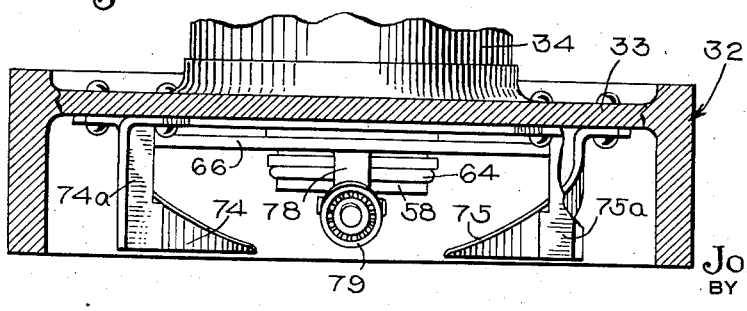
INVENTOR
Joseph C. McCune
BY
ATTORNEY

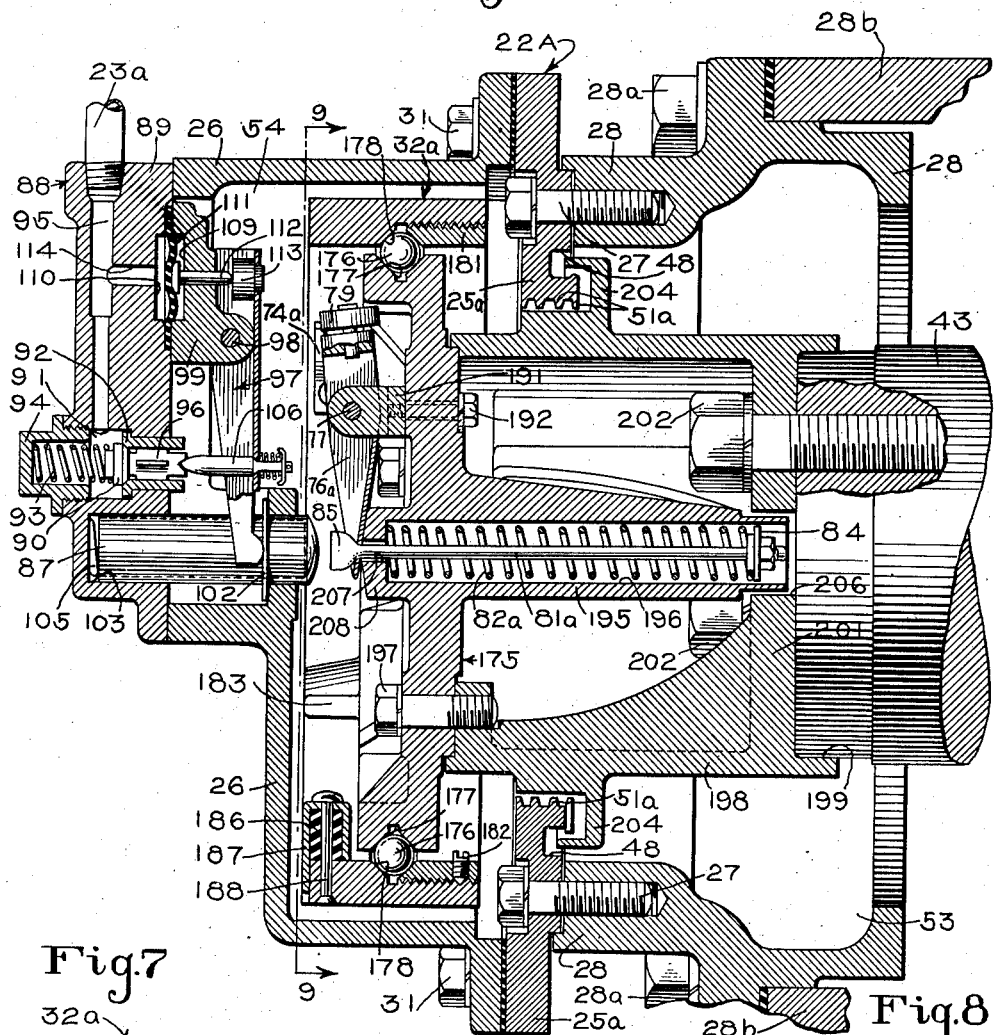
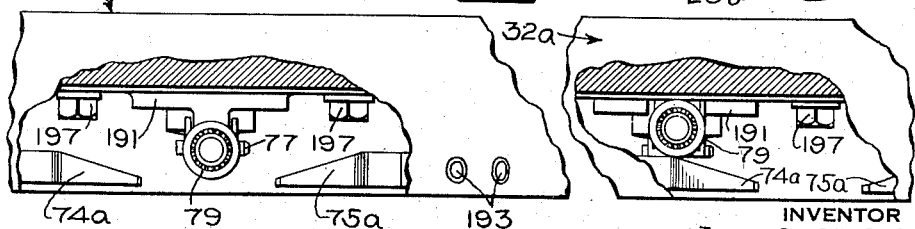

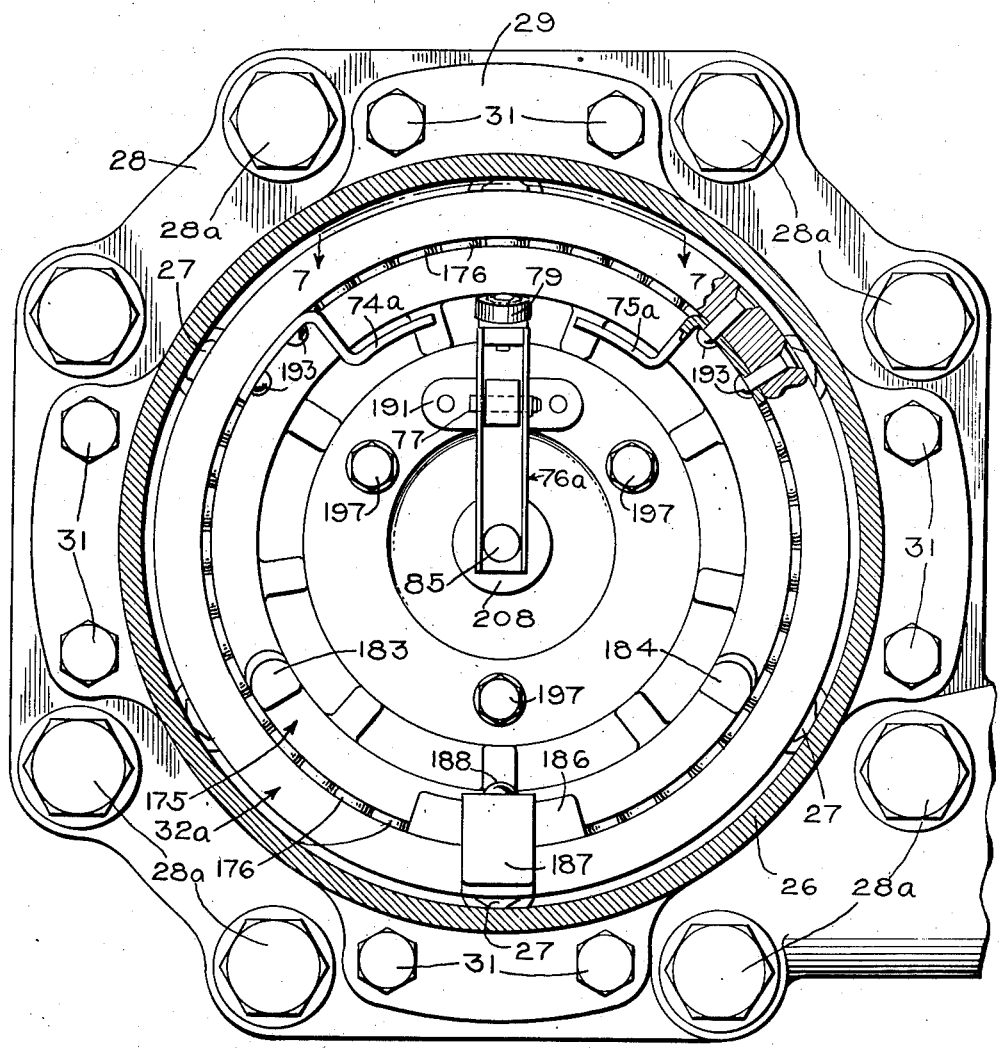

April 27, 1948. J. C. McCUNE 2,440,343
BRAKE CONTROL SYSTEM
Original Filed April 30, 1943   8 Sheets-Sheet 6
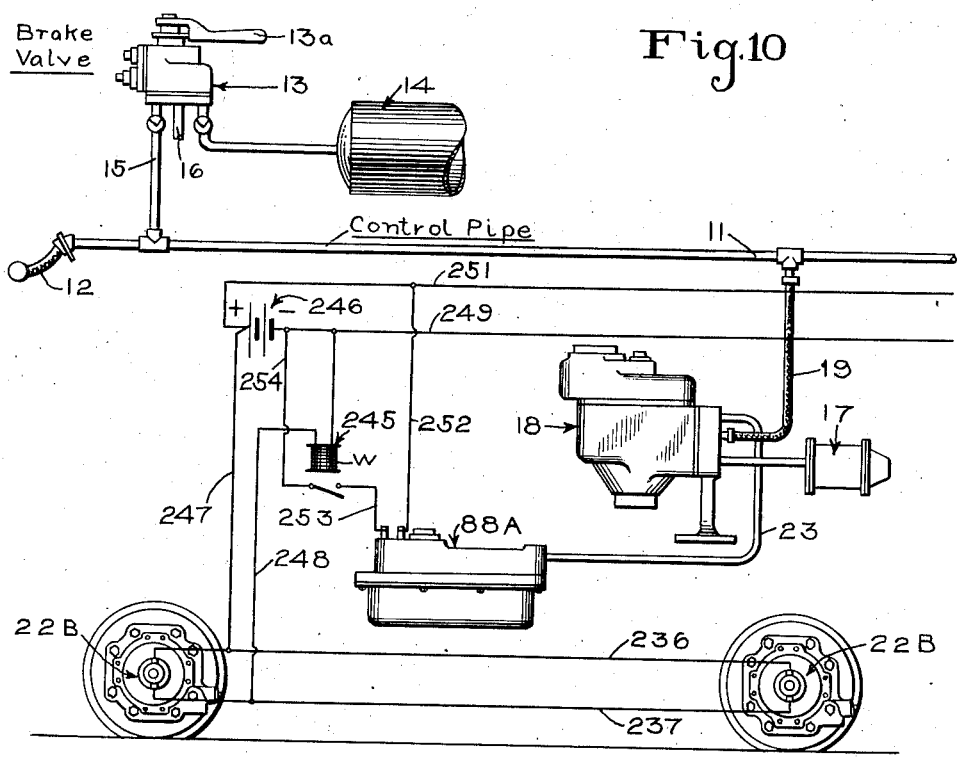
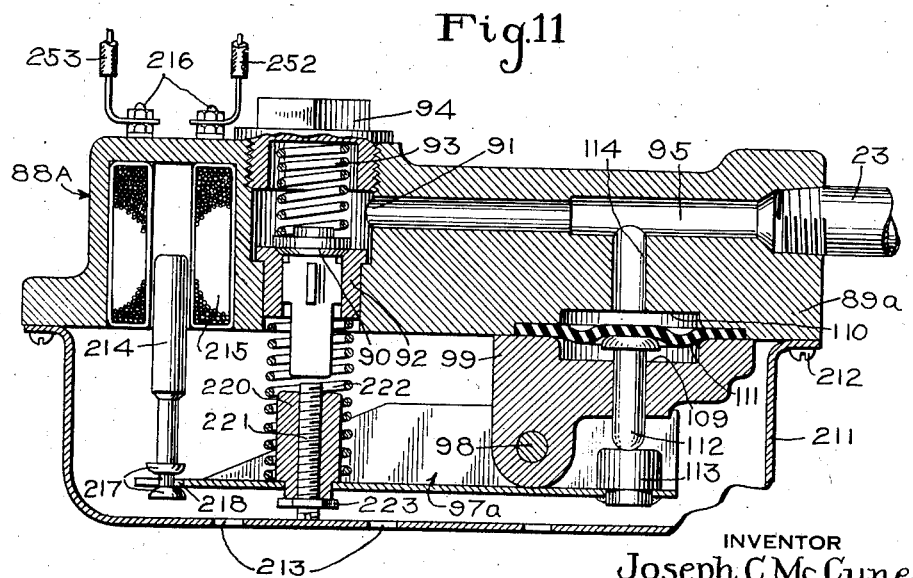
INVENTOR
Joseph C. McCune
BY
A. L. Vencill
ATTORNEY April 27, 1948.  J. C. McCUNE  2,440,343
BRAKE CONTROL SYSTEM
Original Filed April 30, 1943   8 Sheets-Sheet 7
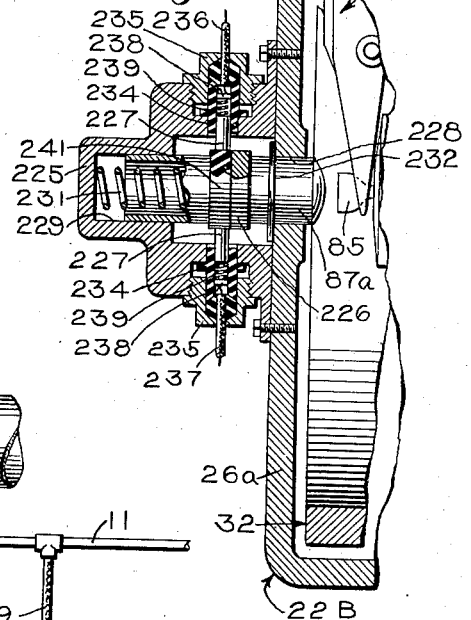
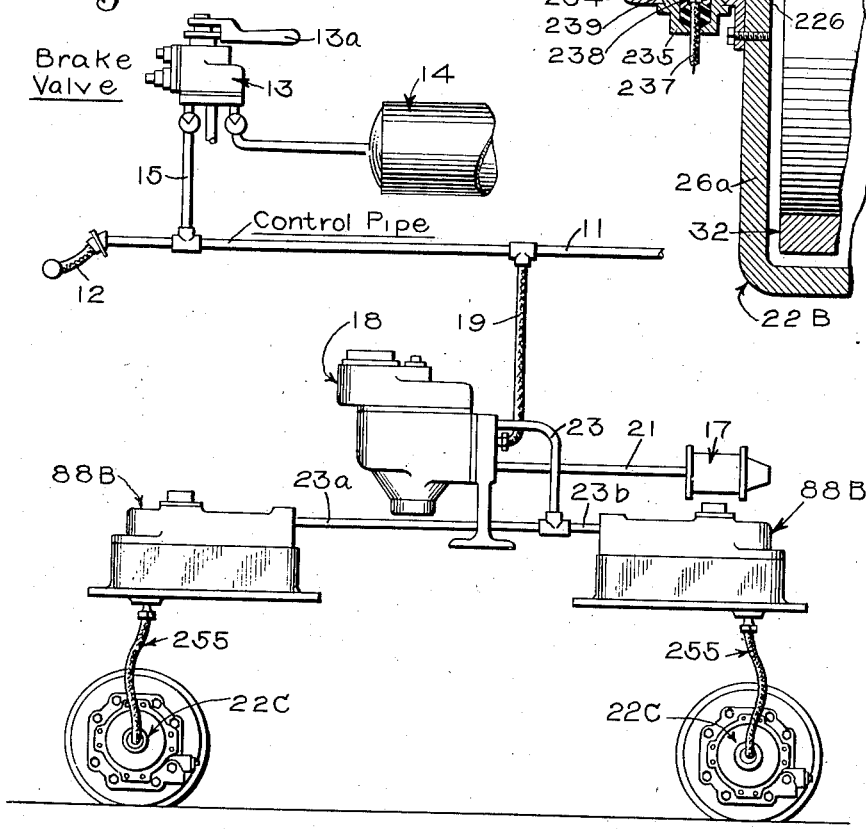
INVENTOR
Joseph C. McCune
BY
ATTORNEY April 27, 1948.　　　　J. C. McCUNE　　　　2,440,343
BRAKE CONTROL SYSTEM
Original Filed April 30, 1943　　8 Sheets-Sheet 8
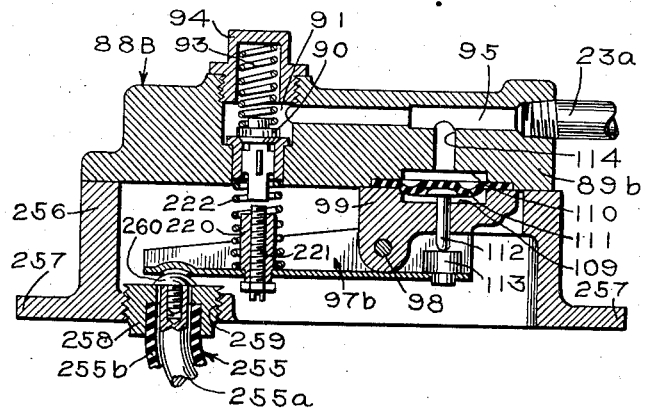
Fig.14
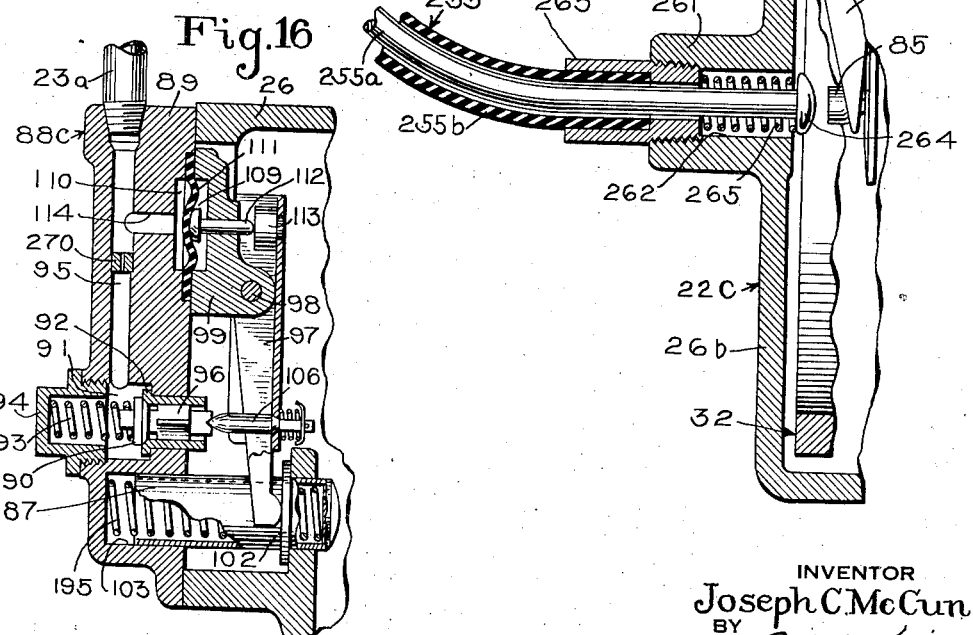
Fig.15
Fig.16
INVENTOR
Joseph C. McCune
BY
ATTORNEY Patented Apr. 27, 1948

2,440,343

UNITED STATES PATENT OFFICE 2,440,343

BRAKE CONTROL SYSTEM

Joseph C. McCune, Edgewood, Pa., assignor to The Westinghouse Air Brake Company, Wilmerding, Pa., a corporation of Pennsylvania Original application April 30, 1943, Serial No. 485,130. Divided and this application February 24, 1944, Serial No. 523,648

11 Claims. (Cl. 303—21)

This invention relates to brake control systems for vehicles, such as railway cars and trains, and has particular relation to apparatus for controlling the brakes associated with the vehicle wheels in a manner to prevent sliding thereof due to excessive braking. The present application is a division of my prior copending application Serial No. 485,130, filed April 30, 1943, and assigned to the same assignee as this application.

Sliding of the wheels of railway cars and trains due to excessive braking effort exerted on the wheels in relation to the adhesion between the wheels and the rails is a problem for which an adequate and yet simple solution has long been sought. The term "sliding" as applied herein to vehicle wheels refers to the dragging of a vehicle wheel along a rail or road surface in locked or non-rotative condition. Sliding of railway car wheels causes flat spots to be developed on the wheels necessitating repair or replacement of the wheels and is therefore objectionable because of the expense and delay involved. Moreover, the retardation exerted on a railway car by a sliding wheel is much less than that of a freely rolling wheel and sliding of a wheel is thus a dangerous condition from a safety stand point.

Within the last few years, various devices have been proposed and applied to railway cars and trains for the purpose of detecting the slipping condition of a car wheel and operative in response to the slipping condition to effect a rapid reduction in the degree of application of the brakes, independently of the operator's control of the brakes, so as to cause a slipping wheel to be restored to a speed corresponding to car speed without decelerating to a locked or sliding condition.

The term "slipping" or "slipping condition" as employed herein in connection with vehicle wheels refers to the rotation of a vehicle wheel at a speed different from that corresponding to vehicle speed at a given instant and may be caused either by excessive propulsion torque or excessive braking torque applied to a wheel. In the case of excessive propulsion torque, the vehicle wheel rotates at a speed faster than that corresponding to vehicle speed at a given instant; whereas, in the case of excessive braking torque, the vehicle wheel rotates at a speed less than that corresponding to vehicle speed at a given instant.

When a vehicle wheel begins to slip due to excessive braking torque, it decelerates at an abnormally rapid rate from a speed corresponding to vehicle speed toward zero speed corresponding to a locked condition. It has been determined that ordinarily under the most favorable adhesion conditions between a railway car wheel and the rail on which it rolls, the wheel cannot greatly exceed a rate of deceleration corresponding to retardation of the car at five miles per hour per second without slipping. If, therefore, a railway car wheel decelerates at a rate exceeding a certain rate corresponding to retardation of the car at ten miles per hour per second, it is a positive indication that the wheel is slipping.

The various devices heretofore proposed for recognizing the slipping condition of a vehicle wheel due to excessive braking, or for that matter due to excessive propulsion torque, have been based on this fundamental principle that rotative deceleration or acceleration of a vehicle wheel at rate exceeding a certain predetermined rate is indicative of the slipping condition.

The devices heretofore proposed for recognizing or detecting a wheel slip condition have been both electrical and mechanical in nature. One of the mechanical types of devices heretofore proposed for detecting the slipping condition of a vehicle wheel has been of the so-called rotary inertia or fly-wheel type. In this type of device, a fly-wheel is rotatively driven according to the speed of rotation of a vehicle wheel or wheel unit through a resilient connection which permits a limited amount of leading or lagging movement of the fly-wheel rotatively with respect to its driving wheel unit in response to deceleration and acceleration of the wheel unit respectively, the amount of leading or lagging movement of the fly-wheel relative to the driving wheel unit being substantially directly proportional to the rate of deceleration or acceleration of the wheel unit. By means of suitable switch devices responsive to a predetermined leading or lagging movement of the fly-wheel rotatively relative to its wheel unit and corresponding to a predetermined rate of deceleration or acceleration suitable control of the brakes or of the propulsion means has been provided whereby to cause termination of the slipping condition. In the case of slipping of the wheels due to excessive braking effort, such devices operate so rapidly as to cause a slipping wheel to be restored to a speed corresponding to vehicle car speed before the slipping wheel decelerates to a locked condition and slides.

It has been proposed, heretofore, to associate a wheel-slip detecting device of the rotary inertia type directly with a railway car wheel and axle unit, such as by mounting the device in the axle journal casing and driving it by direct connection with the end of the axle. Patent No. 2,198,-

033 to Clyde C. Farmer discloses such an arrangement.

It has been found, however, that due to the road shock transmitted to the device when carried in direct association with the wheel and axle unit of a railway car, the life of such devices is excessively short. In other words, the excessive road shock results in hammering or breaking of parts and consequently interferes with the proper sensitivity or operation of the device.

It is accordingly an object of my invention to provide novel apparatus which may be associated directly with a wheel unit of a railway car for the purpose of detecting the deceleration or acceleration thereof which can withstand the road shock to which it is subjected and which has a relatively long service life obviating the necessity for frequent servicing or repair.

It is another object of my present invention to provide wheel slip detecting apparatus of the rotary inertia or fly-wheel type and characterized by a novel construction which minimizes the effect of road shock and wear due to rotative movement of the fly wheel relative to its supporting and drive shaft.

It is another object of my present invention to provide deceleration control apparatus including a wheel-slip detecting device characterized by a construction enabling wholly pneumatic control of fluid pressure operated brakes by the wheel-slip detecting device.

It is another object of my invention to provide control apparatus for fluid pressure operated brakes of railway cars and trains for insuring rapid reduction in the degree of application of the brakes to below a certain degree sufficient to cause the restoration of a slipping wheel back to a speed corresponding to vehicle speed in response to a momentary pneumatic control impulse set up by the wheel-strip detecting apparatus.

The above objects, and other objects of my invention which will be made apparent hereinafter, are attained by several embodiments of my invention subsequently to be described and shown in the accompanying drawings, wherein Fig. 1 is a simplified diagrammatic view of a fluid pressure brake control apparatus applied to a single four-wheel truck and including one form of wheel-slip detecting apparatus for controlling the brakes in a manner to prevent sliding of the wheels, Fig. 2 is an enlarged sectional view of a vent valve mechanism shown in Fig. 1 which functions automatically to effect reduction in the degree of application of the brakes associated with the vehicle wheels to below a certain degree and a subsequent increase in the degree of application of the brakes in response to an initiatory pneumatic impulse, Fig. 3 is an enlarged sectional view showing one embodiment of the novel wheel-slip detecting device, of the rotary inertia type, employed in Fig. 1, Fig. 4 is a sectional view, taken on the line 4—4 of Fig. 3, showing further details of the device, Fig. 5 is a sectional view, taken on the line 5—5 of Fig. 4, showing further details of the device, Fig. 6 is an enlarged sectional view of a modification of the wheel-slip detecting device shown in Fig. 3, Figs. 7 and 8 are fragmental views showing the cam mechanism constituting a part of a wheel-slip detecting device shown in Fig. 6 for different positions of the rotary inertia ring or fly-wheel, respectively, Fig. 9 is a view, taken substantially on the line 9—9 of Fig. 6, showing further details of the device, Fig. 10 is a simplified diagrammatic view of a fluid pressure brake control equipment for a single four-wheel car truck representing a modification of the arrangement shown in Fig. 1, Fig. 11 is an enlarged sectional view of the electrically controlled pilot valve device shown in Fig. 10, Fig. 12 is a fragmental enlarged sectional view showing a modification of the wheel-slip detecting devices of either Fig. 3 or Fig. 6, characterized by a switch mechanism for controlling the electrically controlled pilot valve shown in Fig. 11, Fig. 13 is a simplified diagrammatic view of a fluid pressure brake control system which is a modification of that shown in Fig. 1, Fig. 14 is an enlarged sectional view showing details of the mechanical operated pilot valve device employed in Fig. 13, Fig. 15 is an enlarged fragmental view showing a modification of either of the wheel-slip detecting devices shown in Figs. 3 and 6, and employing a Bowden wire for remote mechanical operation of the pilot valve device shown in Fig. 14, and Fig. 16 is a fragmental view, showing a modified form of a pilot valve device that has a snap-opening and delayed closing characteristic.

Description of apparatus shown in Figs. 1 to 5

It will be understood that the apparatus comprising my present invention is intended to be utilized and operated in connection with conventional fluid pressure brake control apparatus for passenger cars and trains, particularly that type of apparatus known as the "HSC" equipment designed especially for high speed trains traveling at speeds in excess of 100 miles per hour. The particular type of fluid pressure brake control apparatus in which my invention apparatus may be employed is immaterial, however, and I have disclosed in the drawings a simplified fluid pressure brake control apparatus of the straight-air type including a train pipe 11 made up of longitudinal sections on each car of a train connected from car to car by the usual hose couplings 12, a brake valve 13 of the self-lapping type for controlling the pressure in the pipe 11 which will be hereinafter referred to as the control pipe, and a reservoir 14 normally charged with fluid under pressure as by a fluid compressor, not shown, and constituting the source of fluid pressure.

The brake valve 13 is of the well known self-lapping type having self-lapping valve mechanism including a rotary operating shaft on which is an operating handle 13a for rotating the shaft to different operative positions. The handle 13a has a normal brake release position in which control pipe 11 is vented to atmosphere through a branch pipe 15 and an exhaust port and pipe 16. When the brake valve handle 13a is shifted out of the brake release position in one direction into an application zone, the valve mechanism of the brake valve is operated to cause fluid under pressure to be supplied from the reservoir 14 through the pipe 15 to charge the control pipe 11 to a pressure corresponding substantially to the degree of displacement of the brake valve handle 13a out of its brake release position. If the pressure in the control pipe 11 tends to reduce for any reason, such as leakage or for other reasons hereinafter made apparent, the self-lapping valve mechanism of the brake valve operates automatically to maintain a supply of fluid under pressure from reservoir 14 to the control pipe 11 to maintain a pressure corresponding to the position of the brake valve handle.

The fluid pressure brake control apparatus is shown in Fig. 1 as applied to a four-wheel car truck having two separately rotating wheel and axle units, one wheel 16 of each unit being shown.

A standard brake cylinder 17 is provided for operating the usual brake shoes, associated with the vehicle wheels 16, through the medium of conventional brake rigging and brake levers, the brake shoes and brake rigging being omitted from the drawing for simplicity.

According to my invention, a so-called vent valve mechanism 18 is provided for controlling the connection between the control pipe 11 and the brake cylinder 17 in a manner hereinafter more fully explained. Briefly, however, the vent valve mechanism 18 normally provides a communication for between a branch conduit or pipe 19 of the control pipe 11, which pipe 19 is indicated as flexible in character, and a pipe 21 hereinafter referred to as the brake cylinder pipe leading to the brake cylinder 17. The pipe or conduit 19 is flexible in character because the control pipe 11 is carried on the body of the car and the vent valve mechanism 18 is carried on the car truck which moves relative to the car body.

The vent valve mechanism 18 is operatively controlled by wheel-slip detecting devices 22 associated with each of the wheel and axle units, respectively, through a flexible pipe or conduit 23 having two branches 23a and 23b leading respectively to the two different wheel-slip detecting devices 22. The pipes or conduits 23, 23a, and 23b are flexible in character in view of the relative movement between the non-spring-supported or "unsprung" wheel and axle units and spring-supported or "sprung" portion of the truck frame carrying the vent valve mechanism 18.

As will be explained more fully hereinafter, whenever either of the wheel-slip detecting devices 22 operate in response to the slipping condition of the corresponding wheel unit, the vent valve mechanism 18 is correspondingly operated to first cut-off the communication between the control pipe 11 and the brake cylinder 17 and then effect a continued, rapid reduction of the pressure in the brake cylinder 17 until the pressure in the brake cylinder 17 reduces below a certain low pressure, such as eight pounds per square inch. The vent valve mechanism 18 thereafter operated automatically to restore the communication between the control pipe 11 and the brake cylinder 17 to effect the resupply of fluid under pressure to the brake cylinder and a consequent re-application of the brakes.

Referring to Fig. 3, each wheel slip detecting device or rotary inertia device 22 is mounted within a sectionalized casing comprising an annular end plate 25 and end cover 26. The end plate 25 is secured as by a plurality of screws 27 to the outer end of a removable adapter ring or casing 28 which is in turn, attached as by a plurality of bolts or screws 28a to the outer end of the standard axle journal casing 28b. The end cover 26 is substantially circular in form and is provided with four circumferentially spaced flanges 29 through which a plurality of screws or bolts 31 extend to secure the end cam to the end plate 25 which is of corresponding outer contour.

The rotary inertia device itself comprises an annular inertia ring or fly-wheel 32, the outer rim of which is joined through an intervening web 33 to a central hub 34. Hub 34 is rotatively mounted or journaled on a spindle 35, attached to the end of the axle in the manner more fully described presently, by means of two ball bearing races 36 disposed in axially spaced relation within the hub 34.

The spindle 35 is a fabricated member as shown, but it may be an integral casting if desired. As shown, the spindle 35 comprises a securing flange or disk 38 having a central bore or hole of circular or polygonal contour 39 in which one end of a tubular member 41 is received, and a plurality of angularly spaced supporting webs 42 suitably welded to the tubular member 41 and the disk 38 for maintaining the tubular member 41 in rigid perpendicular relation to the disk 38.

The disk 38 of the spindle 35 is provided with a suitable circular recess 38a on the outer face thereof in which the outer end of the axle 43 is received and is fixed to the axle by a plurality of screws 44 extending through suitable holes in the disk into registering tapped holes in the end of the axle. The spindle 35 thus rotates with the axle 43, the tubular member 41 of the spindle being in coaxial relation to the axle.

An annular oil-sealing disk 46 having a central hole therein is fitted over the tubular member 41 of the spindle 35 and secured, as by a pin 47 extending therethrough into one or more of the webs 42, for rotation with the spindle. The disk 46 is of shallow dish shape so that the outer rim thereof is cylindrical in form and parallel to the axis of rotation of the tubular member 41 of the spindle. The rim of the oil-sealing disk 46 extends partially into an annular cavity 48 formed in the face of the end plate 25.

The hub 34 of the fly-wheel 32 extends into a central circular opening in the end plate 25, slightly larger in diameter than the outer diameter of the hub 34. In this central opening in the end plate 25 are a plurality of axially spaced annular ribs 51. The ribs 51 function in cooperation with the sealing disk 46 and annular cavity 48 in the end plate 25 as an oil-seal to prevent the entrance of lubricating oil from the chamber 53, within the adapter ring 28 and axle journal casing 28b into the chamber 54 on the opposite side of the end plate 25 containing the fly-wheel 32. This type of oil-seal arrangement is not my invention.

It will be understood that the oil for lubricating the roller bearings supporting the axle 43 in its journal casing 28b extends normally to the level indicated by the broken line 55 within the adapter ring 28. It is necessary, therefore, to prevent the entrance of oil into the chamber 54 in order to prevent an accumulation of oil in chamber 54 to a level such that the lower portion of the fly-wheel 32 would run in oil, inasmuch as this would interfere with the proper operation of the wheel-slip detecting device.

For ease of assembly and disassembly, the inner bearing ring of the bearing races 36 supporting the fly-wheel 32 on spindle 35 has an internally threaded sleeve 57 extending therethrough which screws on the outer threaded portion of the tubular member 41 of spindle 35 to a position clamping the oil-seal ring 46 against the end of the webs 42. Sleeve 57 has an annular shoulder 58 at one end and a snap ring 59 at the other end for holding the sleeve 57 in assembled relation with the bearing races 36.

The fly-wheel 32 is thus installed and removed from the spindle 35 by screwing the sleeve 57 on the threaded portion of the tubular member of the spindle 35 without disturbing or removing the end plate 25. Consequently it is not necessary to drain oil from the axle journal casing in order to remove the fly-wheel for inspection or repair.

The sleeve 57 has four slots 61 spaced around the end thereof which are adapted to register with correspondingly spaced slots 62 in the end of the tubular portion 41 of the spindle 35, the sleeve 57 being locked on the tubular portion 41 of the spindle 35 by means of a key 63, in the form of a Maltese cross, having four arms adapted to be received in the registering slots 61 and 62. (Fig. 4.) A snap ring 64, cooperating with an annular groove on the outer surface of the sleeve 57, holds the key 63 in position.

A stop disk 66, the purpose of which will be explained presently, having a central hole is secured on the sleeve 57 outside the shoulder 58, as by welding. A portion of the periphery of stop disk 66 is cut away to a reduced radius, thereby providing two angularly spaced stop shoulders 66a and 66b. (Fig. 4.) Secured to the web 33 of the fly-wheel 32 between the shoulders 66a and 66b, and in the plane thereof is a stop lug comprising a pin 68 riveted to the web and having a rubber bushing 59 thereon covered by a protecting sheet metal ring 71. The total degree of rotative movement of the fly-wheel 32 with respect to the spindle 35 is thus determined by the amount of rotative movement occurring between the engagement of the stop lug by the shoulder 66a and the engagement of the stop lug by the shoulder 66b.

Secured, as by riveting to the web 33 of the fly-wheel 32, are two circumferentially spaced arcuate cams 74 and 75, respectively. The free end of the cams is rigidly supported against deflection by a bracket 74a or 75a welded thereto and attached as by rivets to the web of the fly-wheel 32. Cooperating with the cams 74 and 75 is an operating lever 76 of channel-shape which is disposed radially with respect to the axis of rotation of spindle 35 and is pivoted at a point between the ends thereof on a pin 77 carried in a lug 78 that is attached to the stop disk 66 as by welding. The outer end of the lever 76 has a roller 79 rotatively mounted thereon for engaging the inner cam surfaces on the cams 74 and 75, as shown particularly in Figs. 3 and 5.

The peripheral or angular spacing between the cams 74 and 75 is such that the fly-wheel rotatively floats normally between the cams through a predetermined angle which is sufficient to cause revolution of the balls of the ball bearing races 36 through at least one complete revolution. This specific arrangement is a particular feature of my invention and its purpose is to uniformally distribute the wear on the balls of the ball bearing races and insure adequate lubrication of the balls to minimize wear on the balls.

The inner end of the pivoted lever 76 terminates adjacent the outer end of the tubular member 41 of spindle 35 substantially at the axis of rotation of spindle 35 and has a hole therein through which a rod 81 extends into the central bore 41a of the tubular member 41. A coil spring 83 contained in the bore 41a in concentric relation to the rod 81 is interposed between the key 63 and a collar 84, fixed on the end of the rod 81, to urge the rod normally in an axial direction toward the axle 43.

The rod 81 has an enlarged portion or head 85 at the end thereof which engages the inner end of the pivoted lever 76 and the length of the rod 81 is such that the pivoted lever 76 is normally pivotally biased to the position determined by the engagement of the lever with the end of the tubular portion 41 of spindle 35, in which the roller 79 is in the alignment with the base of the inclined cam surfaces on the cams 74 and 75, as shown in Fig. 3.

When the fly-wheel 32 shifts rotatively in one direction with respect to the spindle 35 due to deceleration or acceleration of the axle 43, the roller 79 on the lever 76 engages the corresponding one of the cam surfaces on the cams 74 and 75, and depending upon the rate of deceleration or acceleration of the axle 43, is correspondingly pivoted in a right-hand direction as seen in Fig. 3 in opposition to the force of spring 83, which is correspondingly compressed.

The spring 83 is so designed that unless the axle 43 rotatively decelerates at a rate exceeding a certain rate, corresponding to a rate of retardation of the car of ten miles per hour per second, the plunger or rod 81 is not shifted appreciably in the left-hand direction by the pivotal movement of the lever 76. In view of the fact, previously explained, that a car wheel does not attain a rate of deceleration, corresponding to a rate of retardation of the car of ten miles per hour per second, unless the wheel is actually slipping, it will be seen that the rod 81 is not shifted appreciably in the left-hand direction out of the position shown unless the wheels fixed on the axle 43 are actually slipping.

If the axle 43 rotatively decelerates at a rate exceeding that corresponding to a retardation of the car of ten miles per hour per second, the rod 81 is shifted sufficiently in the left-hand direction out of the normal position shown to engage the operating plunger 87 of a pilot valve device 88 embodied in a casing section 89 attached to the outer face of the casing section 26, which pilot valve device will now be described.

Essentially, the pilot valve device 88 comprises a poppet valve 90 contained in a chamber 91 and urged into seated relation on a seat bushing 92 by a coil spring 93 interposed between the valve and a screw plug 94 closing the opening of the chamber 91 to the exterior of the casing.

A passage 95 is open at one end to the chamber 91 and at the opposite end to the exterior of the casing 89. The corresponding pipe 23a or 23b leading from the vent valve mechanism 18 is connected to the outer end of the passage 95, as by a screw connection.

The valve 90 has a fluted stem 96 that is guided in the seat bushing 92 and projects into the chamber 54 of the casing section 26.

The valve 90 is unseated by movement of the operating plunger 87 through an intervening lever 97. The lever 97 is of channel shape and is pivotally mounted between the ends thereof on a pin 98 supported in a bracket member 99 that is attached to the inner face of the casing section 89, as by screws not shown.

A portion of the web of the lever 97 is cut away and the side flanges spread apart to form a yoke that straddles the plunger 87 which is tubular in form. The ends of the yoke arms or side flanges of the lever 97 are suitably rounded to form substantially a point contact with the side surface of a radially extending collar 102 formed on or attached to the external surface of the plunger 87.

The plunger 87 is slidably supported at one end in a bore 103 in the casing section 89 and at the opposite end in a hole 104 in a portion of the wall of the casing section 26, the longitudinal axis of the plunger coinciding with the axis of rotation of axle 43 and the axis of rod 81. The inner end of the plunger 87 projects into the chamber 54 and is closed to provide a rounded contact head. A coil spring 105 contained within the tubular plunger 87 and interposed between the closed end thereof and the casing section 89 normally yieldingly biases the plunger in the right-hand direction to a position determined by the engagement of the collar 102 with the casing section 26. In this position the inner rounded contact end of the plunger 87 has a slight clearance with respect to the head 85 on the operating rod 81.

A toggle pin 106, secured to the web of the lever 97, has a pointed end engaged in a conical recess on the inner end of the fluted stem of the valve 90 and is thus effective to transmit the force exerted by the lever 97 to the valve 90 to effect unseating thereof. The toggle pin adjusts itself automatically to the angular position of the lever 97 so that the force exerted by the lever to unseat the valve 90 is always in a straight line coincident with the axis of the fluted stem of the valve. Consequently, there is no tendency at any time to cause cocking of the valve 90 on its seat and unintended and undesired leakage of fluid under pressure past the valve 90 from the passage 95 is thus prevented.

In order to balance the force of the fluid pressure in the passage 95 urging the valve 90 to its seated position and resisting the unseating thereof, a movable abutment shown as a flexible diaphragm 111 is provided for exerting a counterbalancing or balancing effect. This abutment may take the form of a piston, if desired. The diaphragm shown is of suitable flexible rubber and is clamped around the periphery thereof between the bracket member 99 and the casing section 89. Two cavities or chambers 109 and 110, preferably circular in cross-section, are provided in the bracket member 99 and the casing section 89 on opposite sides of the diaphragm 111, the chamber 110 communicating with the passage 95 through a branch passage 114 so that the diaphragm is subject on one face thereof to the pressure of the fluid in the passage 95 moving it in a right-hand direction.

A follower pin 112 is loosely guided in the bracket 99 in perpendicular relation to the center of the diaphragm, a suitable head on the pin engaging the face of the diaphragm within the chamber 109. Chamber 109 is thus connected to atmosphere and the corresponding face of diaphragm 111 open to chamber 109 is thus always subject to atmospheric pressure. The end of the follower pin 112 is suitably rounded for engaging a contact lug 113 attached, as by welding, to the web of the lever 97 at a point on the opposite side of the fulcrum pin 98 relative to the toggle pin 106.

It will accordingly be seen that the force exerted on the lever 97 by the fluid pressure acting on the diaphragm 111 urges the lever in a clockwise direction and in opposition to the force of spring 93 and of the fluid pressure in chamber 91 holding the valve 90 seated. The arrangement is such that the effective force exerted by the diaphragm to unseat valve 90 is slightly less than the fluid pressure force and the force of the spring 93 holding the valve 90 seated.

By reason of the arrangement above described, it will be apparent that a relatively light force is required to rock the pivoted lever 97 in a clockwise direction to effect unseating of the valve 90. This is desirable because of the magnitude of the forces available to shift the operating rod 81 in a left-hand direction. Moreover, it is intended that the position of the operating rod 81 accurately reflects the rate of change of rotational speed of the axle 43. It is desirable, therefore, to avoid adding a substantial resisting force to the displacement of the operating rod 81 in the left-hand direction for the reason that such resisting force would prevent the rod 81 assuming a position corresponding to the rate of change of speed of the axle 43.

It is furthermore desirable that the valve 90 be unseated promptly in response to a rate of rotative deceleration of the axle 43 reflecting a wheel-slip condition. Consequently, it is desirable that the force required to unseat the valve 90 be relatively small so as not to delay the unseating of the valve 90 in response to a wheel-slip condition.

The chamber 54 in the casing section 26 is at atmospheric pressure by reason of the connection to atmosphere through the axle journal casing 28b. It follows therefore that when the valve 90 is unseated, it vents fluid under pressure from passage 95 to atmosphere at a rapid rate. As will be apparent from subsequent description, such rapid venting of the fluid under pressure in the passage 95 initiates a responsive operation of the vent valve mechanism 18.

The vent valve mechanism 18 comprises a casing having a pipe bracket and mounting section 18a, a body section 18b, and a cap section 18c, the sections being secured together as shown in Fig. 2 by suitable screws not visible in the drawing, sealing gaskets being provided at the contact faces of the sections.

The pipe bracket section 18a is provided with three ports or passages 19x, 21x, and 23x, having tapped openings for receiving the threaded ends of the correspondingly numbered pipes or conduits 19, 21, and 23 shown in Fig. 1.

The body section 18b has a lower conical portion in which is a large vent port 121 which is controlled by a differential piston valve 122.

The differential piston valve 122 comprises an annular piston 123 and a relatively smaller piston 124, the two pistons being connected by a tubular stem 125. The outer face of the piston 124 is provided with an annular gasket 126 that engages an annular rib seat formed on a seat bushing 127 fixed in the casing section 89b at the vent port 121.

The piston 123 operates in a bushing 128 fixed in the casing and the piston 124 operates in a bushing 129 fixed in the casing.

The bushing 129 extends through a chamber 131 in the casing section 18b out of which the port 21x opens. The interior of the bushing 129 is open at the upper end thereof to a chamber 132 out of which the port 19x opens.

A plurality of ports 133 in the bushing 129 provides communication between the chamber 132 and the chamber 131 when the piston 124 of the piston valve 122 is seated on the seat bushing 127. It will thus be apparent that when the control pipe 11 in Fig. 1 is charged with fluid under pressure, such fluid under pressure flows through the pipe 19 and port 19x, into the chamber 132 where it acts on the lower face of the annular piston 123, thence through the ports 133 to the chamber 131, and through port 21x, and pipe 21 to the brake cylinder 17.

At the same time, fluid under pressure from chamber 132 flows through a choke 135 having a restricted orifice into a passage 136, the passage 136 being open to the port 23x and also connected to a cavity or passage 137 in the cap section 18c that leads to the chamber 138 formed within the bushing 128 above the piston 123.

A coil spring 139, contained in the tubular stem 125, is interposed between the face of cap section 18c and the inner face of piston 124 for urging the piston 124 into seated position on the seat bushing 127 in opposition to the force of the fluid pressure in chamber 132 exerted upwardly on the lower face of the piston 123.

When fluid under pressure, supplied through the pipe 23 and branch pipes 23a and 23b to the pilot valve devices 88 of the several wheel-slip detecting devices 22, is vented at a rapid rate by operation of the pilot devices 88 in the manner heretofore described, the reduction of pressure in the chamber 138 above the piston 123 produces a differential fluid pressure on the piston 123 such that the piston 123 is urged upwardly in opposition to the yielding force of the spring 139 into seated engagement on the open portion of the contact face of the cap section 18c.

In such position of the piston valve 122, the piston 124 is shifted to a position above the ports 133, thereby cutting off the communication between the chamber 132 and chamber 131 and consequently, the supply of fluid under pressure from the control pipe 11 to the brake cylinder 17. At the same time, with the piston 124 thus unseated from the seat bushing 127, the chamber 131 and the connected brake cylinder 17 are connected to atmosphere through ports 133 to the exhaust port 121 so that fluid under pressure is rapidly exhausted from the brake cylinder 17.

In order to maintain piston valve 122 in its uppermost position, in which fluid under pressure is vented from the brake cylinder 17, until the pressure in the brake cylinder reduces below a certain low pressure such as eight pounds per square inch, an arrangement is provided for continuing the reduction of the pressure in the chamber 138 in accordance with the reduction of the pressure in the brake cylinder 17. This arrangement comprises a poppet valve 141 and a control valve 142. The poppet valve 141 seats on a seat bushing 143 fixed in a bore 144 in the cap section 18c and has a cylindrical guiding stem 145 that is slidably received in a bore 146 in a screw plug 147 closing the open end of the bore 144. A coil spring 148 interposed between the screw plug 147 and the valve 141 yieldingly biases the valve into seated position on the seat bushing 143.

Extending from the valve 141 on the side opposite the guide stem 145 is a fluted stem 149, the lower end of which is adapted to be engaged by a boss 151 on the inner face of the piston 124 when the piston valve 122 is raised to its uppermost position. In the uppermost position of the piston valve 122, the position of the piston 124 is such as to effect unseating of the poppet valve 141.

The control valve 142 is contained in a chamber 153 that is connected through a passage 154 to the bore 144, containing the poppet valve 141, and is seated normally downwardly on a seat bushing 155 by a spring 156 in opposition to a spring 157 tending to unseat the valve. The spring 156 acts on a cylindrical follower 158 slidable in a bore 159 of a screw plug 160 screwed into the cap section 18c, the follower in turn engaging the upper face of an imperforate flexible diaphragm 161 clamped around the periphery thereof in the cap section 18c by the screw plug 160.

The screw plug 160 is provided with an annular cavity or chamber 162 open to the upper face of the diaphragm 161 and constantly open to atmosphere through an exhaust port 164.

When the poppet valve 141 is unseated upwardly by the piston valve 122 it causes the chamber 138 to be connected through the bore 144 and passage 154 to the chamber 153 at the lower side of the diaphragm 161. Assuming sufficient fluid pressure in the brake cylinder 17, control valve 142 will have been unseated by the brake cylinder pressure acting on the inner seated area thereof in opposition to the force of spring 156. With chamber 153 thus charged with fluid at the same pressure as in the brake cylinder the force of spring 156 is thus nullified and the spring 157 is effective to hold the control valve 142 unseated upwardly from its seat bushing 155. With the valves 141 and 142 thus unseated, chamber 138 is connected through the passage 165 to the chamber 131, thereby causing the fluid pressure in the chamber 138 to reduce in accordance with reduction of the pressure in the chamber 131 and the connected brake cylinder 17.

The piston valve 122 is thus maintained in its uppermost position by the pressure of the fluid in the chamber 132 acting on the underside of the piston 123 as long as the control valve 142 is unseated. When the fluid pressure in the chamber 153 active on the lower face of the diaphragm 161 reduces to a low value, such as eighteen pounds per square inch, the force exerted by spring 156 becomes effective to reseat the valve 142. With the valve 142 seated, the fluid under pressure supplied through the choke 135 from the supply pipe 19 and chamber 132 results in a build-up of pressure in the chamber 138 assisting the spring 139 and effective to promptly shift the piston valve 122 downwardly to the position wherein the piston 124 is reseated on the seat bushing 127. A certain time interval elapses between the instant control valve 142 is reseated and the instant that piston 124 cuts off the further venting of fluid under pressure from the brake cylinder 17 due to the time required to build-up the pressure in chamber 138 through choke 135 sufficient to shift the piston valve 122 downwardly. During this interval of time, the reduction of brake cylinder pressure continues and at the time piston 124 cuts off further reduction in brake cylinder pressure, the brake cylinder pressure will have reduced further to a value such as eight pounds per square inch. The spring 148 accordingly acts to reseat the poppet valve 141 and is of sufficient strength to maintain it seated in opposition to the pressure of fluid in the chamber 138 acting on its inner seated area.

With the piston valve 122 restored to its normal position shown in Fig. 2, the supply communication between the pipe 19 and the brake cylinder pipe 21 is again established through the ports 133, and the pressure in the brake cylinder is thus again built-up in accordance with the pressure established in the control pipe 11.

Upon restoration of pressure in the brake cylinder 17, control valve 142 is unseated due to the brake cylinder pressure acting in passage 165 on its inner seated area. Chamber 153 is thus charged to a pressure corresponding to brake cylinder pressure and such pressure acting on diaphragm 161 overcomes the force of spring 156 and compresses it upwardly. Spring 157 is thus rendered effective again to hold valve 142 unseated. The fluid pressure from chamber 153 acts in bore 144 to assist in maintaining valve 141 seated.

It will thus be seen that when the pressure of the fluid in the chamber 138 is suddenly reduced by operation of a pilot valve device 88 of either of the wheel-slip detecting devices 22, the pressure of the fluid in the brake cylinder 17 is thereafter automatically first reduced to a predetermined low pressure and then restored to the value corresponding to the pressure established in the control pipe 11.

*Operation of apparatus shown in Figs. 1 to 5*

Let it be assumed that the car having the apparatus shown in Fig. 1 is traveling under power and that the operator desires to apply the brakes to bring the car to a stop. To do so the operator first shuts off the propulsion power and then shifts the brake valve handle 13a out of its brake release position into its application zone an amount corresponding to the desired degree of brake application.

The control pipe 11 is accordingly charged to a pressure corresponding to the position of the brake valve handle in its application zone, such as forty pounds per square inch. At the same time, fluid under pressure from the control pipe 11 flows through the pipe 19, vent valve mechanism 18 and pipe 21 to the brake cylinder 17, the pressure established in the brake cylinder thus corresponding to the pressure established in the control pipe 11. The brakes are accordingly applied to the car wheels 16 to a degree corresponding to the pressure of the fluid in the brake cylinder 17.

As long as the wheels 16 do not slip, the operator may vary the degree of brake application by increasing or decreasing the pressure in the control pipe 11, the pressure in the brake cylinder 17 varying in accordance with the pressure in the control pipe 11 by reason of the normal connection maintained between the branch pipe 19 and the brake cylinder pipe 21 through the vent valve mechanism 18.

If, however, upon application of the brakes in the manner just described, one of the wheel units begins to slip, a further operation occurs which will now be described. When the axle 43 of the slipping wheel unit is rotatively decelerated at the abnormally rapid rate occurring during the slipping condition, the fly-wheel 32 over-runs the spindle 35, and the roller 79 on the lever 76 rides up the inclined surface on the cam 74 or 75 corresponding to the direction of rotation, thereby causing the lever 76 to be rocked so as to shift the rod 81 outwardly to effect unseating of the valve 90 of the pilot valve device 88.

The vent valve mechanism 18 is accordingly operated, in the manner previously described, to cut off the supply of fluid under pressure from the control pipe 11 to the brake cylinder 17 and vent fluid under pressure at a rapid rate from the brake cylinder.

Due to the instantaneous and rapid reduction of the pressure in the brake cylinder 17, the wheels of the slipping wheel unit promptly cease to decelerate and begin to accelerate back toward a speed corresponding to car speed before the speed of the slipping wheels is reduced to zero, and thus before the wheels can become locked and slide.

The rotative acceleration of the axle 43 of the slipping wheel unit at this time is at an abnormally rapid rate corresponding, in order of magnitude, to the abnormally rapid rate of deceleration during the wheel-slip condition. The fly-wheel 32 accordingly shifts rotatively from a leading to a lagging position with respect to the spindle 35 and axle 43. The roller 79 on the lever 76 thus runs down the inclined cam surface on the cam 74 (or 75) which it engaged during deceleration of the wheel unit and engages and climbs the inclined surface on the other cam 75 (or 74), thus again shifting the rod 81 outwardly in the left-hand direction, as seen in Fig. 3, to again effect unseating of the valve 90 of the pilot valve device 88.

During the interval that the roller 79 on the lever 76 disengages one of the cams 74 or 75 and engages the other, the lever 76 is restored to its normal position by the spring 83 through the medium of the rod 81. With the force of the rod 81 on the plunger 87 thus momentarily removed, the spring 195 restores the plunger 87 momentarily to its normal position, thus permitting the valve 90 to be promptly reseated because of the substantially balanced fluid pressure forces acting on the valve 90 and the diaphragm 111 as applied to the lever 97.

Such momentary closure of the valve 90 is without consequence, however, for the reason that the cycle of operation of the vent valve mechanism 18 is carried through automatically, once it is initiated in response to the initial rapid reduction of the pressure in the control chamber 138 thereof, without regard to the momentary closure of the valve 90 of the pilot valve device 88.

When the wheels of the slipping wheel unit have accelerated fully back to a speed corresponding to car speed, the wheels are again decelerated in accordance with the rate of retardation of the car at the normal low rate, such as four miles per hour per second, depending upon the degree of brake application. In such case, therefore, the fly-wheel 32 again shifts rotatively from a lagging position to a leading position with respect to the axle 43. The lever 76 is thus again restored to its normal position during the interval in which the roller 79 on the lever disengages one of the cams 74 or 75 and engages the other. The valve 90 is thus correspondingly reseated to cut off further venting of fluid under pressure from the passage 95. Moreover, as long as the wheels of the previously slipping unit do not again decelerate at more than the normal rate, the angular displacement of the lever 76 due to cooperation with one or the other of the cams 74 or 75 is insufficient to cause the rod 81 to be moved outwardly enough to effect displacement of the plunger 87 of the pilot valve device in the left-hand direction out of its normal position. Consequently, the valve 90 in the pilot valve device 88 remains seated thereafter until such time as the wheels or wheel units associated with the axle 43 again begin to slip.

Notwithstanding the reseating of the valve 90 of the pilot valve device 88, the piston valve 122 of the vent valve mechanism 18 remains in its uppermost position continuing the reduction of the pressure in the brake cylinder as long as the control valve 142 remains unseated. The rate of supply of fluid under pressure through the choke 135 from the branch pipe 19 of the control pipe is relatively small compared to the rate at which fluid under pressure is vented to atmosphere from the chamber 138 past the valves 141 and 142 and through the exhaust port 121. Consequently, the restoration of the valve 99 of the pilot valve device to its seated position does not in any way interrupt the cycle of operation of the vent valve mechanism 18 once such operation is initiated.

The time that elapses from the instant that a wheel unit begins to slip to the instant that it is restored fully to a speed corresponding to car speed is ordinarily relatively short, being of the order of one and one-half to two seconds. The length of time required for the pressure in the brake cylinder 17 to be reduced from the pressure existing therein at the time slipping of the wheels begins, to the relatively low pressure of eight pounds per square inch, in response to operation of the vent valve mechanism 18, is a variable one which may be longer or shorter than the duration of the slipping condition depending upon the pressure in the brake cylinder at the instant the slipping condition begins.

If the pressure in the brake cylinder 17 is reduced to eight pounds per square inch before the slipping wheel unit attains a speed corresponding to vehicle speed, then the vent valve mechanism 18 will be restored to its normal condition, in which communication is established through which fluid under pressure is resupplied to the brake cylinder, before the slipping wheel unit reaches a speed corresponding to car speed. On the other hand, if the vent valve mechanism 18 is restored to its normal position, in response to the reduction of pressure in the brake cylinder, after the slipping wheels or wheel units have been restored to car speed, then the communication through which fluid under pressure is resupplied to the brake cylinder is not established until such time.

In any event, the resupply of fluid under pressure to the brake cylinder 17 is not effected by the vent valve mechanism 18 until the slipping wheels have been restored at least substantially to a speed corresponding to car speed. In no case, is the degree of reapplication of the brakes due to the resupply of fluid under pressure to the brake cylinder likely to cause sliding of the wheels for the reason that no appreciable degree of brake application is exerted on the wheels while the wheels are at the low point of the speed curve during the slipping cycle.

If the adhesion between the car wheels and the rails is a continuing low value, it is possible that the reapplication of the brakes on car wheels which previously slipped may cause repeated slipping of the same wheels or wheel units. In such case, however, the wheel-slip detector 22 associated with such wheel units operates repeatedly, in the manner previously described, to reduce the degree of application and then increase the degree of application so that at no time are the wheels permitted to become locked and slide.

When fluid under pressure is supplied from the control pipe 11 to the brake cylinder 17 under the control of the vent valve mechanism 18 following a slipping condition of the wheels, the pressure in the control pipe tends to reduce correspondingly. Due to the pressure-maintaining feature of the brake valve 13, however, the pressure in the control pipe 11 is maintained in accordance with the position of the brake valve handle notwithstanding the supply of fluid under pressure for the control pipe to the brake cylinder. If the operator does not effect a change of pressure in the control pipe, therefore, the degree to which the brakes are reapplied on a previously slipping wheel will correspond to that in effect at the time the slipping condition first occurred. Usually, the operator effects a reduction in the degree of application of the brakes by reducing the pressure in the control pipe as the car or train reduces in speed, particularly as it approaches low speed. In such case there is less likelihood that slipping of the wheels will occur upon reapplication of the brakes.

The construction of the wheel-slip detecting devices 22 in such a manner that the fly-wheel 32 is free to shift, unresistedly, relative to the spindle 35 and axle 43 through a predetermined angle determined by the angle through which the roller 79 on the lever 76 moves in shifting from one of the cams, such as cam 74, to the other of the cams is one of the novel features of my present invention. The fact that the fly-wheel 32 is free to float or shift rotatively at all times in unresisted manner through the predetermined angle relative to the axle in the manner just pointed out, causes the individual balls of the ball bearing races 36 to be rotated through at least one complete revolution repeatedly upon slight changes in the rotational speed of the axle 43. As a result, the lubricating grease in the ball bearing races is constantly active between the contacting surface of the balls and the annular ball retaining elements. Wear on the balls is thus minimized. At the same time, due to the revolution of the balls through at least one complete revolution, the wear on the balls of the ball bearing races is evenly distributed so as to prevent the balls from attaining an elliptical or egg-shaped form. Obviously, if the true spherical form of the balls is departed from, the friction in the ball bearing races is increased and the sensitivity and the accuracy of the wheel-slip detecting device as a whole is seriously impaired.

In heretofore known wheel-slip detecting devices of the rotary inertia type, the fly-wheel is yieldingly maintained in a certain normal rotative position relative to the driving spindle or shaft thereof by constantly active resilient means and is shifted yieldingly out of such position to a degree corresponding to the rate of change of speed of the driving spindle. In such case, the total degree of rotative movement of the fly-wheel relative to the driving spindle is so limited that the fly-wheel bearing elements, whether of the ball or roller type, cannot rotate through at least one complete revolution. Consequently, after a period of time, the balls or rollers are worn unevenly and attain an elliptical or egg-shaped form, thus interfering with the sensitivity and the accuracy of the device.

The arrangement which I have provided serves to prevent the uneven wear on ball elements of the ball bearing races and on roller elements of roller bearing races if such bearing races are employed and thus obviates the need for repair or replacement of the bearing units.

When the car or train comes to a stop in response to a brake application, the brakes remain applied according to the pressure established in the control pipe 11. In order to release the brakes before applying propulsion power to again start the car or train, the operator merely shifts the brake valve handle to its release position to reduce the pressure in the control pipe 11 to atmospheric pressure. The fluid under pressure in the brake cylinder 17 is thus vented to atmosphere by reverse flow back through vent valve mechanism 18, control pipe 11 and the exhaust port of the brake valve to effect the release of the brakes.

Figures 6, 7, 8, and 9

A different form of wheel-slip detector 22A is shown in Figs. 6, 7, 8 and 9. The wheel-slip detector 22A is similar in many respects to the wheel-slip detector 22 and corresponding parts will, therefore, be designated by the same reference numerals without further description. It is deemed sufficient, therefore, merely to point out the differences in the construction of the wheel-slip detector 22A with respect to the wheel-slip detector 22.

Essentially, the wheel-slip detector 22A differs from the wheel-slip detector 22 in the manner of mounting the fly-wheel for rotative movement with respect to the axle 43. Referring to Fig. 6, the fly-wheel 32a is in the form of a ring and is mounted directly on a disk-shaped hub member 175 of relatively large diameter by means of a continuous series of ball bearings 176 confined in a tubular annular groove formed by cooperating V-shaped grooves 177 and 178 in the outer surface of the hub member 175 and the internal surface of the fly-wheel or ring 32a, respectively.

In order to permit assembly of the balls 176 between the fly-wheel 32a and the hub member 175 in the grooves 177 and 178, one end of the fly-wheel 32a is of enlarged internal diameter and is threaded to receive an exteriorly threaded ring 181. When the ring 181 is screwed into the end of the ring 32a, it provides one of the side surfaces of the annular groove 178. A set screw 182 is provided for locking the ring 181 in place after it is properly adjusted so as to permit free movement of the balls 176 without unnecessary looseness or play.

The degree of rotative movement of the fly-wheel 32a with respect to the hub 175 is limited by two angularly spaced lugs 183 and 184 formed on or attached to the hub member 175 and arranged to engage opposite ends respectively of a rubber stop 186 that is secured to the fly-wheel 32a by a bracket 187 and a rivet 188.

A lever 76a, corresponding to the lever 76 of the wheel-slip detecting device 22 is pivotally mounted on a pin 77 carried by a bracket 191 attached, as by a plurality of screws 192, to the hub member 175. The lever 76a has a roller 79 rotatably mounted thereon which cooperates with a pair of cams 74a and 75a, secured as by rivets 193 to the inner surface of the fly-wheel 32a.

For the same reason as in the previously described wheel-slip detector 22, the cams 74a and 75a of device 22A are so peripherally or angularly spaced that the angle through which the fly-wheel 32a floats rotatively relative to the axle 43 when the roller 79 on lever 76a shifts from one cam 74a or 75a to the other is such as to insure revolution of the balls 176 through at least one complete revolution.

The hub member 175 is secured adjacent the outer periphery thereof by a plurality of screws 197 to a cylindrical member 198, the member 198 having a recess 199 in the end wall 201 thereof, in which the outer end of the axle 43 is received. The cylindrical member 198 is secured to the axle 43 by a plurality of screws 202 which extend through corresponding holes in the end wall 201 into tapped holes in the end of the axle. The recessed portion of the end wall 201 supports the cylindrical member 198 in rigid coaxial alignment with the axle 43 and prevents the imposition of excessive shearing stresses on the screws 202 due to shocks and jars incidental to travel of the car on the train rails.

The cylindrical member 198 is provided with a radially extending oil-sealing flange 204 that terminates at the periphery thereof in a cylindrical portion. The cylindrical portion of the flange 204 extends axially into an annular cavity 48 in the face of end plate 25a. The end plate 25a is secured as by a plurality of bolts or screws 27 to the outer end of adapter ring 28. The end plate 25a has a series of axially spaced annular ribs 51a surrounding the central opening therein and the cylindrical member 198 is provided with a portion of increased diameter for fitting closely within the central opening of end plate 25a with slight clearance with respect to the annular ribs 51a. The arrangement of the annular ribs 51a with respect to the cylindrical member 198 and of the oil-sealing flange 204 with respect to cavity 48 of end plate 25a is such as to prevent the entrance of oil from the adapter ring 28 into the chamber 54 formed in the casing section 26. This oil-seal arrangement is analogous to the arrangement provided in the wheel-slip detector 22 and is not per se my invention.

The hub member 175 has a central tubular portion 195 which is supported at the outer end thereof in a central opening 206 in the end wall 201 of the cylindrical member 198. An operating rod 81a, corresponding to the operating rod 81 of the wheel-slip detector 22, extends through an opening in the lower end of the lever 76a and through a small hole 207 in a central boss 208 on the hub member 175 into the bore 196 of the tubular portion 195. Interposed between a guide collar or washer 84 fixed on the inner end of the rod 81a and the base of the bore 195 is a coil spring 82a for urging the rod 81a in the right-hand direction as seen in Fig. 6. A head 85 on the end of the rod 81 cooperates with the lever 76a in a manner such that the spring 82a is effective to urge the lever in a counterclockwise direction into normal engagement with boss 208 of the hub member 175.

The operation of the wheel-slip detecting device 22A is the same as that described for the wheel-slip detecting device 22 and it is deemed unnecessary, therefore, to repeat a description of such operation, except to point out that the lever 76a is rocked in a clockwise direction and rod 81a shifted in the left-hand direction in opposition to the straining force of the spring 82a when the rate of deceleration or acceleration of the wheel axle 43 is such as to cause sufficient rotative movement of the fly-wheel 32a with respect to the hub member 175.

The wheel-slip detector 22A is provided with a pilot valve device 88 identical to that described previously for wheel-slip detector 22 which device includes an operating plunger 87 disposed in coaxial alignment with the operating rod 81a and engaged by the operating rod 81a in its movement in the left-hand direction.

Figures 10, 11 and 12

Referring to Figs. 10, 11, and 12, a modification of the equipment shown in Fig. 1 is disclosed. Specifically the apparatus shown in Figs. 10, 11, and 12 differs from that shown in Fig. 1 in providing a modified form of wheel-slip detector 22B and a pilot valve device 88A, similar in principle to the pilot valve device 88 of previous embodiments, but embodied in a casing separate from the wheel-slip detector 22B, arranged to be controlled and operated electrically in response to the operation of the wheel-slip detector 22B. This arrangement enables the pilot valve device 88A to be mounted on a spring-supported or a "sprung" portion of a car wheel truck along with the vent valve mechanism 18 and brake cylinder 17, thereby cushioning the effect of road shock and jar on the parts and mechanism of the pilot valve device. In addition, it enables a single pilot valve device to be provided for both wheel units of each wheel truck instead of a pilot valve device for each wheel unit, thus reducing the cost of the equipment in this respect.

Referring particularly to Fig. 11, the pilot valve device 88A is for the most part similar in construction to the pilot valve device 88 previously described and accordingly corresponding parts in the pilot valve devices 88 and 88A will be designated by the same reference numerals without further description. Only so much of the pilot valve device 88A as differs from the pilot valve device 88 will accordingly be described.

Essentially, the pilot valve device 88A differs from the pilot valve device 88 in having a casing 89a with suitable lugs (not shown) whereby the device may be attached to a convenient member of the car truck, and a cover member 211 preferably of sheet metal attached as by a plurality of screws 212 to the lower face of the casing 89a to enclose the parts of the device. The cover member 211 has a plurality of holes 213 therein to provide the necessary communication to atmosphere through which fluid under pressure may be vented.

The pilot valve device 88A differs further from the pilot valve device 88 in having a plunger 214 actuated by a solenoid or electro-magnetic winding 215 for shifting the operating lever 97a, corresponding to the lever 97 of the pilot valve device 88, in a direction to unseat the valve 90. The solenoid winding 215 is secured in a suitable recess provided in the casing 89a and two terminal posts 216 therefor are attached in insulated relation to the casing for connecting the solenoid in a circuit presently to be described. The outer end of the plunger 214 is provided with two axially spaced round shoulders 217 between which the end of the operating lever 97a extends and a slot 218 in the end of the lever forms a fork for straddling the portion of the plunger between the shoulders 217.

When the solenoid 215 is energized, the plunger 214 is actuated upwardly and thus pivotally rocks the operating lever 97a in a clockwise direction, as seen in Fig. 11, to effect unseating of the valve 90. The lever 97 is associated with the valve 90 in the pilot valve device 88a in a slightly different manner than in the pilot valve device 88. As shown in Fig. 11, the lever 97a has a cylindrical boss 220 fixed thereto as by welding, the boss having a bore therein tapped to receive an adjustable stop screw 221 that is locked in position by a lock nut 223. The inner end of the screw 221 is in alignment with and is adapted to engage the end of the fluted stem of the valve 95 but normally has a slight clearance with respect thereto. A coil spring 222, surrounding the boss 220 and interposed between the seat bushing 92 and the lever 97a serves to prevent chattering of the screw 221 on the stem of the valve 90. As shown, spring 222 biases the lever 97a to a normal position determined by the engagement of the end of the screw 221 with the cover 211. Any other means for this purpose may, however, be provided such as cooperating members on the lever 97a and on the bracket 99.

The pilot valve device 88A is effective to control the vent valve mechanism 18 in Fig. 10 in the same manner that the pilot valve devices 88 of previous embodiments control the vent valve mechanism 18 in Fig. 1. However, since there is only one pilot valve device in Fig. 10, the pipe 23 leading from the vent valve mechanism 18 is connected directly into the passage 95 of the pilot valve device 88A. Moreover, since the pilot valve device 88A is carried on the "sprung" portion of the car truck along with the vent valve mechanism 18, the pipe 23 connecting the vent valve mechanism 18 and the pilot valve device 88A may be of rigid construction, if desired, instead of the flexible construction shown in Fig. 1.

As shown in Fig. 12, the modified form of wheel-slip detecting device 22B may, in part, take the form of either the wheel-slip detecting device 22 or that of the wheel-slip detecting device 22A, as far as the fly-wheel and the mounting arrangement therefor is concerned. Essentially, therefore, the wheel-slip detecting device 22B differs from the previously described wheel-slip detecting devices 22 and 22A in providing an end casing 26a, in place of the end casing 26 of the devices 22 and 22A, to which an additional casing section 225 is secured.

The casing section 225 embodies a switch mechanism comprising a plunger 87a having a contact ring 226 in insulated relation thereon for connecting two brush contacts 227 disposed on diametrically opposite sides respectively of the plunger 87a.

The plunger 87a is slidably supported at its inner end in a bore 228 in the end casing section 26a, this end of the plunger extending into the chamber 54 within the casing section 26a into close proximity with the head 85 on the end of the operating rod 81. At its outer end, the plunger 87a is guided in a bore 229 in the casing section 225. A coil spring 231 is contained in the hollow interior of the plunger 87a in interposed relation between the casing section 225 and the closed end of the plunger for urging the plunger normally in the right-hand direction to a position determined by the engagement of a peripheral flange 232 on the plunger with the outside face of the casing section 26a.

The brush contacts 227 are carried in suitable bushings 234 of insulating material inserted in suitable radial openings in the casing 225, each of the bushings 234 being held in position by a cap screw 235 screwed into the outer threaded portion of the radial opening.

Wires 236 and 237 are connected to the opposite brush contacts 227, respectively. The connection between the end of each of the wires and the corresponding brush contact 227 is effected by means of a contact disk 238 secured, as by solder, to the end of the wire and slidable within the insulating bushing 234, a coil spring 239 being interposed between the contact disk and the brush contact 227 to yieldingly urge the brush contact into yielding engagement with the contact surface of plunger 87a and at the same time electrically connect the contact disk 238 to the brush contact.

In the normal or inner position of the plunger 87a, the brush contacts 227 engage an insulating portion 241 of the contact surface of the plunger 87a so that the brush contacts are normally disconnected. When the plunger 87a is shifted in the left-hand direction in response to the pivotal movement of the operating lever 75 (or 76a) of the wheel-slip detecting device and the consequent outward shifting of the operating rod 81 in response to the slipping condition of the wheel unit, the contact ring 226 on the plunger 87a is shifted into registration with brush contacts to establish an electrical connection therebetween.

Referring now to Fig. 10, the electrical circuits whereby the wheel-slip detecting devices 22B control the operation of the pilot valve device 88A will now be described. The two switch devices of the respective wheel-slip detecting devices 22B shown in Fig. 10 are arranged to operate in parallel and to this end, the corresponding brush contacts 227 are connected by the wires 236 and 273. Whenever the brush contacts of the switch device of either one or both of the wheel-slip detecting devices 22B are connected, a circuit is established for energizing the operating winding w of a relay 245. This circuit extends from the positive terminal of a source of direct-current, such as a storage battery 246, by way of a wire 247 to the wire 236, thence through either one or both of the switch devices of the wheel-slip detecting devices 22B to the wire 237, whence the circuit extends by way of a wire 248, the winding w of the relay 245 and a wire 249 to the negative terminal of the storage battery 246.

Upon energization of the winding of the relay 245, the single front contact thereof is actuated from its dropped-out or open position to its picked-up or closed position to establish a circuit for energizing the solenoid 215 of the pilot valve device 88A. This circuit extends from the positive terminal of the battery 246 by way of a wire 251 and a branch wire 252 to one terminal 216 of the solenoid 215, through the solenoid to the other terminal 216 and thence by way of a wire 253, the front contact of the relay 245, a wire 254 and wire 249 to the negative terminal of the battery 246.

It will thus be seen that operation of one or both of the wheel-slip detecting devices 22B is effective to cause operation of the pilot valve device 88A which is, in turn, effective to cause operation of the vent valve mechanism 18 in the same manner previously described in connection with the pilot valve device 88. In view of the previous description of this operation, it is believed unnecessary to repeat it here.

In connection with Fig. 10, it is to be observed that the wires 249 and 251 are battery bus wires which extend throughout the length of the car, whereby to provide a source of voltage for the brake control apparatus associated with all wheel trucks of the car.

*Figures 13, 14, and 15*

Referring to Figs. 13, 14, and 15, apparatus constituting a modification of that disclosed in Figs. 1 and 10 is shown. The parts of the apparatus corresponding to that of previous figures are designated by the same reference numerals without further description and only so much of the apparatus disclosed in Figs. 13 and 14 and 15 as differs from that of previous figures will be specifically described.

Essentially, the apparatus shown in Figs. 13, 14 and 15 differs from the apparatus shown in Fig. 1 in the provision of a modified form of wheel-slip detecting device 22C and a modified form of pilot valve device 88B for each wheel unit.

Like the pilot valve device 88A, the pilot valve devices 88B are separated from the wheel-slip detecting devices and embodied in separate casings. The pilot valve devices 88B are, moreover, mounted on a "sprung" portion of the car truck along with the vent valve mechanism 18 and brake cylinder 17, the operating connection between the pilot valve devices 88B and the corresponding wheel-slip detecting devices being established through a flexible motion transmitting connection in the form of a flexible shaft or Bowden wire 255.

The pilot valve device 88B differs from the pilot valve device 88 in having a casing section 89b attached as by screws to a casing section 256 on which are suitable flanges 257 whereby to attach the device to a supporting member on the wheel truck.

In the pilot valve device 88B, the operating plunger 87 is omitted and operation of an operating lever 97b, corresponding to lever 97, is effected by means of the shiftable wire 255a contained within the outer cylindrical sheath 255b of the Bowden wire. To this end, the one end of the sheath 255b of the Bowden wire 255 is fixed in a screw plug 258 that is screwed into a tapped hole 259 in the casing section 256; and a rounded contact head 260 is screwed into the end of the wire 255a for engaging in a concave recess in the lever 97b. Longitudinal movement of the wire 255a upwardly within the sheath 255b is effective to rock the operating lever 97b in a clockwise direction to unseat the valve 99. The reverse movement of the wire 255a is limited by engagement of the contact head 260 with the screw plug 258. The normal position of lever 97b to which it is biased by spring 222 is thus determined by engagement of the contact held on the wire 255a with the screw plug 258.

The wheel-slip detecting device 22C may take the form of either the wheel-slip detecting device 22 or that of the wheel-slip detecting device 22A as far as the mounting of the fly-wheel and the operation of the operating rod 81 is concerned. Essentially, therefore, the wheel-slip detecting device 22C differs from the devices 22 and 22A in the provision of an end cover 26b having a central boss 261 through which a hole or bore 262 extends axially.

The outer sheath 255b of the Bowden wire has a screw fitting 263, fixed on the end thereof remote from the pilot valve device 88B, which is screwed into the outer threaded portion of the bore 262 in the boss 261. The interior or longitudinally shiftable wire 255a of the Bowden wire extends through an opening in the screw fitting 263 and through the bore 262 in the boss 261 and is provided with a rounded head 264 on the end thereof in coaxial alignment with the contact head 85 on the operating rod of the wheel-slip detecting device 22C. A coil spring 265 contained in the bore 261 in interposed relation between the head 264 on the end of the wire 255a and the screw fitting 263 yieldingly urges the wire 255a in the right-hand direction as seen in Fig. 15 to a position in close proximity to the head 85 on the operating rod 81 of the wheel-slip detecting device, which position is determined by the engagement of the contact head 260, at the opposite end of the Bowden wire, with the screw plug 258.

In operation, when the operating rod 81 of the wheel-slip detecting device is shifted in the left-hand direction in response to a slipping condition of the wheels, the head 85 on the operating rod engages the head 264 on the corresponding end of the shiftable wire 255a and shifts it in opposition to the spring 265 so as to pivotally rock the operating lever 97b of the corresponding pilot valve device 88B in a clockwise direction to unseat the valve 99. When the operating rod 81 is restored to its normal position following the termination of the wheel slipping condition, the spring 265 restores the shiftable wire 255a to its normal position, thereby permitting restoration of the operating lever 97b of the pilot valve device 88B to its normal position.

Referring to Fig. 13, it will be seen that the connection between the vent valve mechanism 18 and the pilot valve devices 88B is established by means of a pipe 23 and two branches 23a and 23b thereof connected respectively to the passages 95 of the corresponding pilot valve devices 88B. In view of the fact that the pilot valve devices 88B are mounted on the "sprung" portion of the wheel truck along with the vent valve mechanism 18 and brake cylinder 17, the pipe 23 and the branch pipes 23a and 23b may be of rigid construction if desired instead of the flexible construction disclosed in the apparatus of Fig. 1.

The vent valve mechanism 18 of Fig. 13 is thus operated in response to the operation of either of the pilot valve devices 88B associated with the different wheel units in exactly the same manner as the vent valve mechanism 18 in the apparatus shown in Fig. 1. Since this operation has already been adequately described in connection with the equipment shown in Fig. 1, it is believed unnecessary to repeat a description of such operation in connection with Fig. 13.

*Figure 16*

In Fig. 16, a modified form of pilot valve device 88C is shown which may be substituted wholly for the pilot valve devices 88 in the wheel-slip detecting devices 22 and 22A of Fig. 3 and Fig. 6 and the basic principle of operation of which may be embodied in pilot valve device 88A and 88B shown in Figs. 11 and 14, respectively. The pilot valve device 88C is in and of itself of general utility and may be used in many other situations than those disclosed in this application.

Essentially, the pilot valve device 88C differs from the pilot valve device 88 in that a suitable choke 270 is introduced into the passage 95 between the branch passage 114 and the chamber 91 containing the poppet valve 90. In other respects the structure of the pilot valve 88C is identical to that of the pilot valve 88 and the parts thereof are accordingly designated by the same reference numerals heretofore employed in connection with the pilot valve device 88, without further description.

The character of the operation imparted to the pilot valve device 88C by reason of the introduction of the choke 270 in the passage 95 is distinctly different from that of the pilot valve device 88 and accordingly will be described in detail.

Assuming that the passage 95 is charged with fluid under pressure in the manner described previously or by reason of connection to any device charged with fluid under pressure, such as reservoir, the unseating of the poppet valve 90 in response to movement of the operating plunger 87 by the rod 81, or by manually applied pressure if the device is used separately, effects a reduction of the pressure acting on the poppet valve 90 at a faster rate than that active on the movable abutment or diaphragm 111 in the chamber 110, by reason of the control of the rate of reduction of the pressure acting on the diaphragm exercised by the choke 270.

As a result, a differential is created between the pressure active on the poppet valve 90 and the pressure of the fluid active on the diaphragm 111, which differential pressure is effective when the poppet valve 90 is barely unseated, to positively actuate the valve 90 to its maximum unseated position by so-called snap action.

Moreover, by reason of this pressure differential, the valve 90 is maintained unseated, after it is once actuated to its unseated position, for a certain length of time determined by the length of time required for the fluid pressure active in the chamber 110 on the face of the diaphragm 111 to be reduced sufficiently with reference to the combined effective force of the spring 93 and that of the fluid pressure on the valve 90.

It will thus be seen that the slightest momentary unseating of the valve 90 by application of force to the plunger 87 is effective to cause the valve 90 to be snapped to its fullest unseated position and maintained therein for a predetermined length of time, notwithstanding the removal of the operating force on the plunger 87.

The snap-opening and the delayed-closing characteristics of the pilot valve device 88C are not essential to the control of the vent valve mechanism 18 in the equipments previously described. Pilot valve device 88 may be employed, however, if it is desired to cause operation of the vent valve mechanism 18 in response to the slightest operating impulse on the plunger 87 sufficient to crack the valve 90 from its seat. It may be desirable in some instances to provide this character of operation in the brake control equipment previously described. Moreover, it may be a matter of individual preference, as far as different railroads are concerned, whether the pilot valve device 88 or 88C is employed.

It will be apparent, however, that the pilot valve device 88C may have particular desirability in fields not related to brake control in connection with a device having a control chamber or reservoir controlled thereby, by reason of its snap-opening and delayed-closing characteristics.

*Summary*

Summarizing, it will be seen that I have disclosed deceleration control apparatus, for railway cars and trains, including a wheel-slip detecting device of novel construction and design for withstanding the severe shock and jars on a wheel and axle unit carrying the device. The rotary inertia element or fly-wheel of the wheel-slip detecting device may float rotatively on its driving spindle through a predetermined angle and is not yieldingly maintained in a certain fixed rotative position with respect to the spindle as in previous devices. The total degree of rotative movement of the fly-wheel relative to the spindle is, however, limited to a greater angle and an operative response of the device to the rate of change of speed of the driving spindle occurs only at the extremities of relative movement between the fly-wheel and the spindle.

The degree of floating rotative movement of the fly-wheel with respect to its driving spindle is such as to insure rotation of the rotary bearing elements mounting the fly-wheel on the spindle through at least one complete revolution so as to maintain active lubrication on the bearing elements at all times and produce an evenly distributed wear on the bearing elements. The effective life of the device, without servicing or repair, is greatly lengthened in comparison to previously known devices wherein the total degree of rotative movement of the fly-wheel relative to the driving shaft thereof is limited to a relatively small angle insufficient to cause rotation of the bearing elements through a complete revolution. When the bearing elements are not rotated through a complete revolution they are worn unevenly and useful life of the device, without servicing or repair, is undesirably short.

Several modified forms of the wheel-slip detecting device are disclosed. In one form, a pilot valve device associated directly with and a part of the wheel-slip detecting device is actuated in response to the rotative movement of the fly-wheel with respect to its driving spindle in either direction to effect operation of a remotely located vent valve mechanism through a pneumatic communication, which vent valve mechanism controls the supply and the release of fluid under pressure to and from the brake cylinder.

In another form of the wheel-slip detecting device, the pilot valve device is separately constituted and carried on resiliently mounted or "sprung" portions of a car truck along with the vent valve mechanisms. Operation of the pilot valve device is effected electrically by means of a switch associated with and operated by the wheel-slip detecting device when a wheel-slip condition occurs.

In a third form of the wheel-slip detecting device, the pilot valve device is separately constituted and is carried on a "sprung" part of the car truck along with the vent valve mechanism. A flexible shaft, in the form of a Bowden wire, mechanically transmits an operating impulse from the wheel-slip detecting device to the pilot valve device, whereby operation of the pilot valve device is effected when a wheel-slip condition occurs.

One form of pilot valve device, particularly is of novel construction and is so constructed and arranged that the poppet valve is operated to its open or unseated position by snap-action to cause venting of fluid under pressure from a communication and is "stuck" in its open position for a certain length of time in response to only a momentary operating impulse.

The vent valve mechanism is also of novel construction and is effective in response to the momentary pneumatic impulse effected by the pilot valve device to effect the continuous reduction of the pressure in the brake cylinders to below a certain pressure, such as eight pounds per square inch, and then cause resupply of fluid under pressure to the brake cylinder to effect reapplication of the brakes.

Having now described my invention, what I claim as new and desire to secure by Letters Patent, is:

1. In a deceleration control apparatus for a railway vehicle having a wheel unit on which the brakes may be applied and released, the combination of means carried by the wheel unit and operatively responsive to the rate of change of rotational speed thereof, valve means carried by a non-rotated casing associated with said wheel unit, means for effecting operation of said valve means in response to a predetermined operation of the first said means, fluid pressure operated brake control means for controlling the brakes associated with the wheel unit, and means providing a fluid pressure communication between the brake control means and the said valve means whereby to cause operation of the brake control means in response to operation of the valve means.

2. In a brake control apparatus for a vehicle having a brake cylinder to which fluid under pressure may be supplied to effect application of the brakes associated with a wheel unit and from which fluid under pressure may be released to effect release of the brakes, the combination of fluid pressure operated valve means responsive to a reduction in a control fluid pressure acting thereon for effecting a reduction of the pressure in a brake cylinder, a normally seated valve subject to the force of the control fluid pressure tending to seat the valve, fluid pressure responsive means also subject to the control fluid pressure and effective to exert a force tending to unseat said valve, and means operatively responsive only to the rotative deceleration of the wheel unit at a rate exceeding a certain rate for exerting a force in addition to the force exerted by the said fluid pressure responsive means effective to cause unseating of said valve, said valve being effective when unseated to effect a reduction of the control fluid pressure acting on said valve means.

3. In a brake control apparatus for a vehicle having a brake cylinder to which fluid under pressure may be supplied to effect application of the brakes associated with a wheel unit and from which fluid under pressure may be released to effect release of the brakes, the combination of fluid pressure operated valve means responsive to a reduction in a control fluid pressure acting thereon for effecting a reduction of the pressure in a brake cylinder, a normally seated valve subject to the force of the control fluid pressure tending to seat the valve, a pivoted lever, fluid pressure responsive means subject to the control fluid pressure acting on the valve means for exerting a force through said lever on said valve tending to but insufficient to unseat said valve, and means cooperating with said lever operatively responsive only to the rotative deceleration of the wheel unit at a rate exceeding a certain rate for exerting a force on said lever to effect unseating of said valve, said valve being effective when unseated to effect a reduction of the control fluid pressure acting on the said valve means.

4. In a brake control apparatus for a vehicle having one or more wheel units on which the brakes may be applied and released, the combination of fluid pressure operated valve means responsive to a predetermined reduction of a control fluid pressure for effecting a reduction in the degree of application of the brakes associated with one or more of the wheel units and a subsequent increase in the degree of application of the brakes, a valve device carried entirely by a non-rotated casing associated with one of the wheel units effective upon operation to effect said predetermined reduction of the control fluid pressure for said valve means, and means carried by the said one wheel unit cooperating with said valve device in such a manner as to effect operation thereof only when a slipping condition of the wheel unit occurs.

5. In a brake control apparatus for a vehicle having one or more wheel units on which the brakes may be applied and released, the combination of a fluid pressure operated valve means responsive to a predetermined reduction of a control fluid pressure for effecting a reduction in the degree of application of the brakes associated with one or more of the wheel units and a subsequent increase in the degree of application of the brakes, means carried by one of the wheel units and operatively responsive to the rotational deceleration thereof, a valve device carried by a non-rotated casing and cooperating with the last said means in such a manner as to be operated only when the rate of deceleration of the wheel unit exceeds a certain rate occurring only when the wheel unit slips, and means consisting solely of a fluid pressure communication between the said valve means and the said valve device whereby operation of said valve device is effective to cause said predetermined reduction of control fluid pressure for said valve means.

6. In a brake control apparatus for a vehicle having a brake cylinder effective in response to fluid pressure established therein to cause application of the brakes associated with one or more wheel units of the vehicle and upon the reduction of fluid pressure therein to effect the release of the brakes, the combination of a fluid pressure operated valve means normally conditioned to establish communication through which fluid under pressure may be supplied to the brake cylinder and operative, in response to a predetermined reduction of a control fluid pressure, to a different position in which the said communication is cut off and an exhaust communication is established through which fluid under pressure is vented from the brake cylinder to effect a reduction in the degree of application of the brakes associated with one or more of the wheel units, means carried by one of the wheel units and operatively responsive to the rotational deceleration thereof, a valve device carried by a non-rotated casing and cooperating with the last said means in such a manner as to be operated only when the said one wheel unit rotatively decelerates at a rate exceeding a certain rate occurring only when the wheel units slips due to braking, and means consisting solely of a fluid pressure communication between said valve means and said valve device to cause said predetermined reduction of the control fluid pressure for said valve means in response to operation of said valve device.

7. In a brake control apparatus for a vehicle having a brake cylinder for controlling the application of the brakes associated with one or more wheel units of the vehicle in accordance with the degree of fluid pressure established therein, the combination of a fluid pressure operated valve means automatically responsive to an initiatory reduction of a control fluid pressure to cause reduction of the pressure in the brake cylinder and at the same time continue the reduction of its own control fluid pressure to below a certain value and then cause resupply of fluid under pressure to the brake cylinder to increase the pressure therein, means carried by a wheel unit and operatively responsive to a slipping condition thereof, a valve device carried by a non-rotated casing and cooperating with the last said means in such a manner as to be operated thereby only when the wheel unit is in a slipping condition, and means consisting solely of a fluid pressure communication between the valve means and the valve device for causing said valve device to be effective to produce said initiatory reduction of the control fluid pressure for said valve means.

8. In a brake control apparatus for a vehicle having a brake cylinder to which fluid under pressure may be supplied to effect application of the brakes associated with a wheel unit and from which fluid under pressure may be released to effect release of the brakes, the combination of fluid pressure operated valve means operatively responsive to a predetermined reduction in a control fluid pressure to effect a reduction of the pressure in the brake cylinder, a valve device operatively responsive to a slipping condition of the wheel unit for effecting a reduction of the control fluid pressure for said valve means, fluid pressure responsive means subject to the control fluid pressure for said valve means and exerting a force in a direction tending to operate the valve device to a position for effecting a reduction of the control fluid pressure for said valve means, and means restricting the reduction of the control fluid pressure active on the fluid pressure responsive means to a rate less than the rate of reduction of the control fluid pressure past said valve device thereby to render said fluid pressure responsive means effective to exert a force to positively actuate said valve device, whenever said valve device is actuated in response to the slipping condition of the wheel unit, so as to insure the said predetermined reduction in the control fluid pressure for the said valve means in response to a momentary slipping condition of the wheel unit.

9. In a brake control apparatus for a vehicle having a brake cylinder to which fluid under pressure may be supplied to effect application of the brakes associated with a wheel unit and from which fluid under pressure may be released to effect release of the brakes, the combination of fluid pressure operated valve means responsive to a predetermined reduction in a control fluid pressure for effecting a reduction of the pressure in the brake cylinder, a valve device operative to effect a reduction of the control fluid pressure for said valve means, means operatively responsive only to the rotative deceleration of the wheel unit at a rate exceeding a certain rate for effecting operation of said valve device, fluid pressure responsive means subject to the said control fluid pressure for said valve means and effective to exert a force on said valve device tending to operate it to a position in which it effects a reduction of the control fluid pressure for said valve means, and means restricting the reduction of the control fluid pressure active on said fluid pressure responsive means to a rate slower than the rate of reduction of the control fluid pressure past said valve device, thereby rendering said fluid pressure responsive means effective to exert a force on said valve device for positively actuating the valve device to a position for effecting said predetermined reduction of the control fluid pressure for said valve means notwithstanding that the rotative deceleration of the wheel unit at a rate exceeding a certain rate endures only momentarily.

10. In a brake control apparatus for a vehicle having a brake cylinder to which fluid under pressure may be supplied to effect application of the brakes associated with a wheel unit and from which fluid under pressure may be released to effect release of the brakes, the combination of vent valve mechanism operatively responsive to a predetermined reduction of a control fluid pressure to cause a reduction of the pressure in the brake cylinder, a pilot valve device operative to effect a reduction of the control fluid pressure for said valve mechanism, means operatively responsive to a predetermined rotative condition of the wheel unit for effecting operation of said pilot valve device, fluid pressure responsive means subject to the said control fluid pressure for said vent valve mechanism and exerting a force on said pilot valve device tending to cause operation thereof to a position in which it effects a reduction of the control fluid pressure, and means for restricting the reduction of the control fluid pressure active on said fluid pressure responsive means to a rate less than that of the control fluid pressure past said pilot valve device rendering said fluid pressure responsive means effective to exert a force on said pilot valve device to positively actuate it to a position for effecting said predetermined reduction of the control fluid pressure and to maintain it therein for a limited time notwithstanding termination of said predetermined rotative condition of the wheel unit.

11. In combination, a valve mechanism operatively responsive to a predetermined reduction of a control fluid pressure for effecting a reduction of the pressure of fluid in a receiving device, a normally seated valve subject to the force of the said control fluid pressure tending to seat the valve, fluid pressure responsive means also subject to the said control fluid pressure and effective to exert a force tending to unseat said valve, means for applying a force to unseat said valve to thereby effect a reduction of the said control fluid pressure, and means restricting the reduction of the control fluid pressure active on said fluid pressure responsive means to a rate less than that occurring past said valve whereby to render said fluid pressure responsive means effective to exert a force for positively actuating said valve to its unseated position to insure the predetermined reduction of the control fluid pressure notwithstanding the removal of the force exerted by said force applying means.

JOSEPH C. McCUNE.

REFERENCES CITED

The following references are of record in the file of this patent:

UNITED STATES PATENTS

| Number | Name | Date |
|---|---|---|
| 2,107,823 | Hallot | Feb. 8, 1938 |
| 2,198,029 | Farmer | Apr. 23, 1940 |
| 2,198,032 | Farmer | Apr. 23, 1940 |
| 2,215,343 | Aikman | Sept. 17, 1940 |
| 2,218,619 | McNeal | Oct. 22, 1940 |